(12) United States Patent
Shimada et al.

(10) Patent No.: US 11,218,661 B2
(45) Date of Patent: Jan. 4, 2022

(54) SIGNAL PROCESSING APPARATUS, PHOTOELECTRIC CONVERSION APPARATUS, IMAGING APPARATUS, AND MOVING BODY

(71) Applicant: CANON KABUSHIKI KAISHA, Tokyo (JP)

(72) Inventors: Atsushi Shimada, Kanagawa (JP); Noriyuki Shikina, Tokyo (JP); Shintaro Takenaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/124,311

(22) Filed: Dec. 16, 2020

(65) Prior Publication Data

US 2021/0195131 A1 Jun. 24, 2021

(30) Foreign Application Priority Data

Dec. 24, 2019 (JP) .............................. JP2019-233226

(51) Int. Cl.
*H04N 5/378* (2011.01)
*H04N 5/357* (2011.01)

(52) U.S. Cl.
CPC ............. *H04N 5/378* (2013.01); *H04N 5/357* (2013.01)

(58) Field of Classification Search
CPC .... H04N 5/357; H04N 5/3575; H04N 5/3745; H04N 5/37455; H04N 5/378
See application file for complete search history.

(56) References Cited

U.S. PATENT DOCUMENTS

| | | | |
|---|---|---|---|
| 10,348,323 B2* | 7/2019 | Xhakoni | H03M 1/1245 |
| 2013/0256512 A1 | 10/2013 | Shioya | |
| 2014/0209784 A1 | 7/2014 | Morita | |
| 2017/0234994 A1 | 8/2017 | Nishihara | |
| 2020/0044659 A1* | 2/2020 | Li | H03M 1/002 |

FOREIGN PATENT DOCUMENTS

JP 2010-252140 A 11/2010

* cited by examiner

*Primary Examiner* — Lin Ye
*Assistant Examiner* — Chriss S Yoder, III
(74) *Attorney, Agent, or Firm* — Canon U.S.A., Inc. IP Division

(57) ABSTRACT

A signal processing apparatus includes an analog-to-digital conversion unit, a determination unit including a comparator, and a data calculation unit that performs calculation. The data calculation unit generates a first calculation result by performing calculation including processing for averaging a first digital signal and a second digital signal or processing for adding the first and second digital signals. The data calculation unit generates a second calculation result based on a difference between the first digital signal and first noise digital data. The data calculation unit switches whether to output the first calculation result or output the second calculation result, based on a comparison result of the comparator.

17 Claims, 23 Drawing Sheets

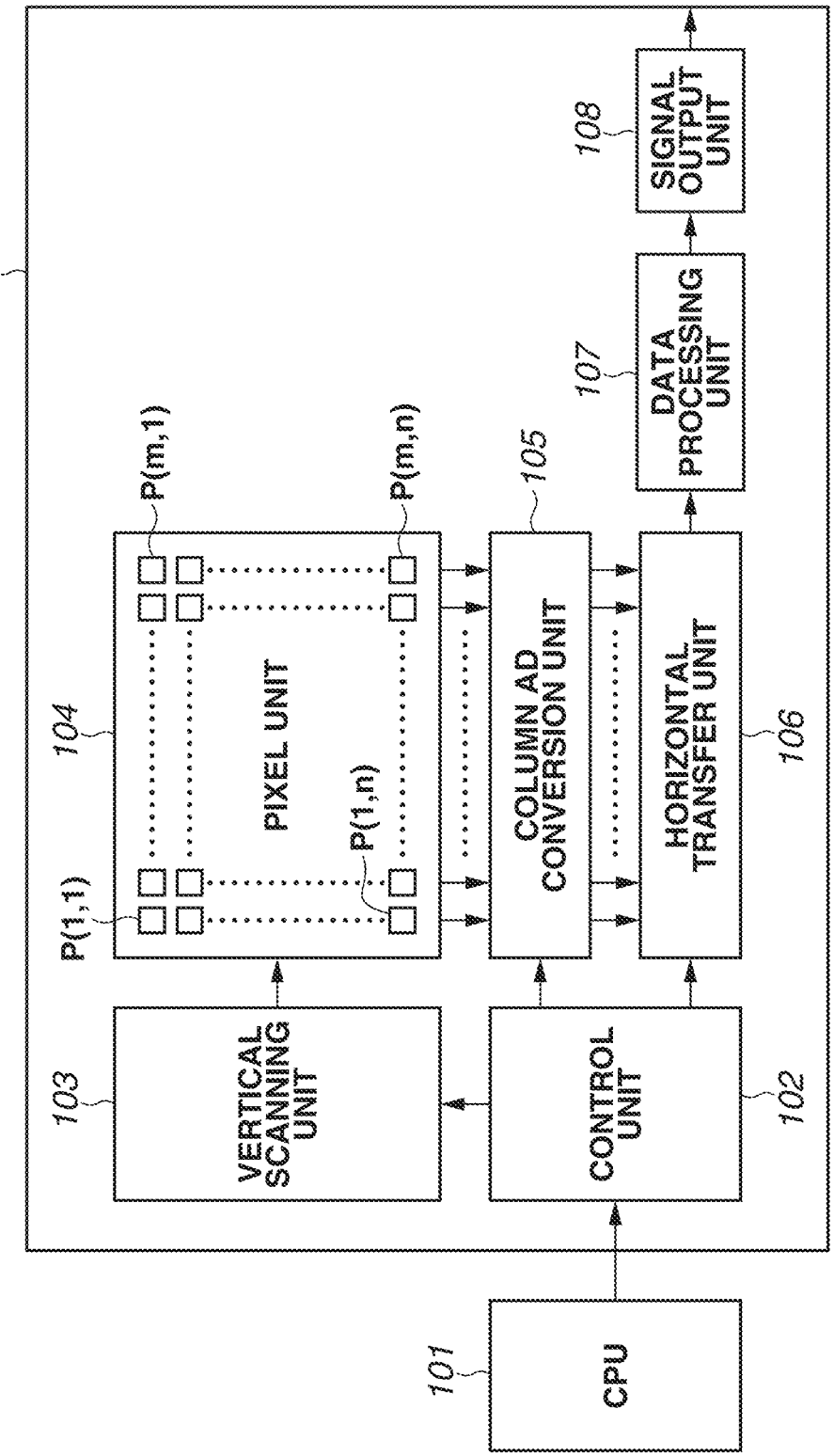

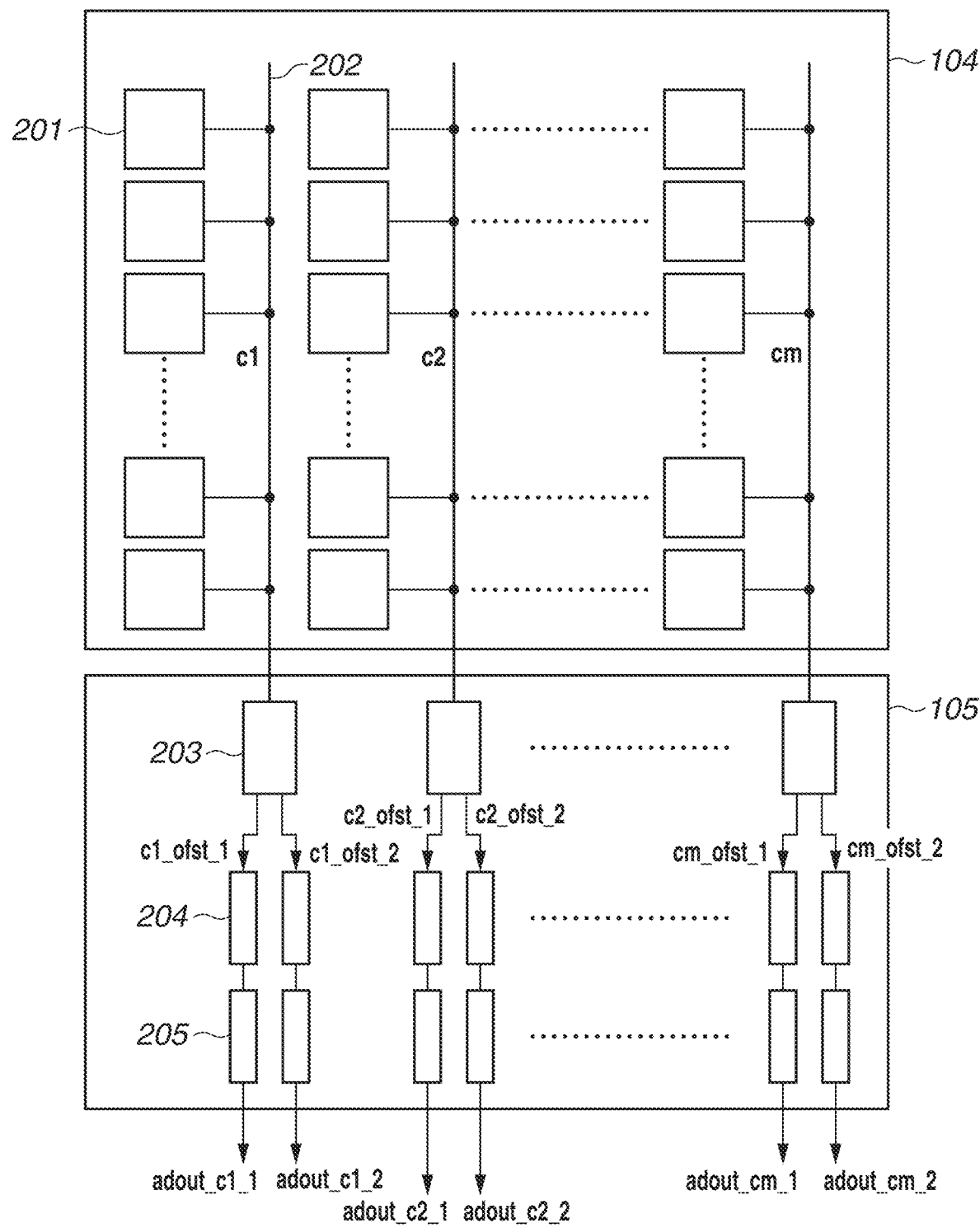

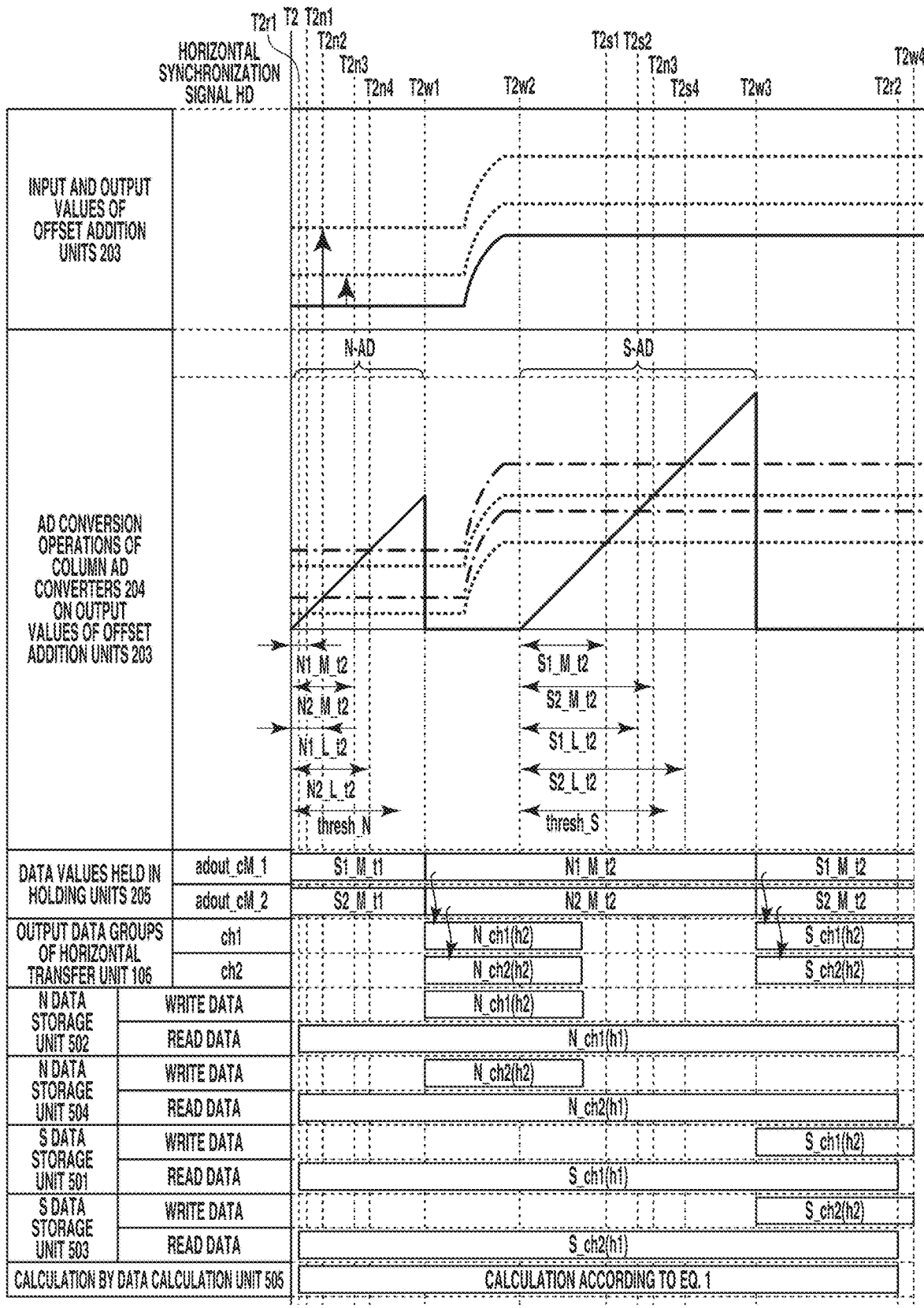

FIG. 14B

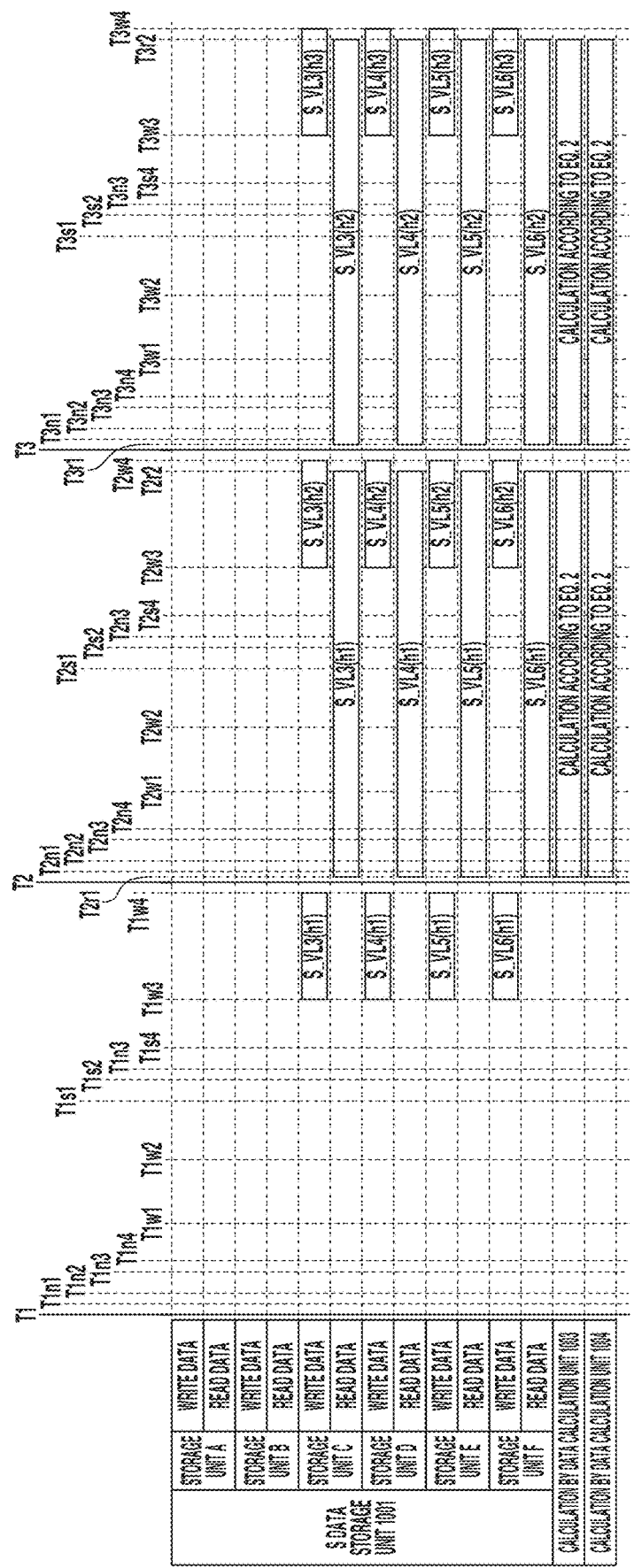

FIG.16A
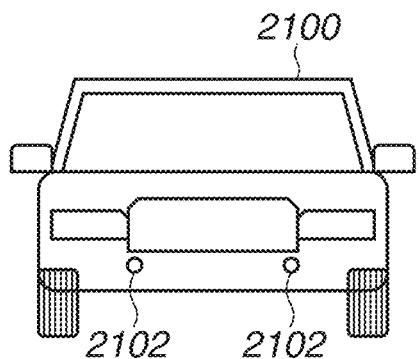
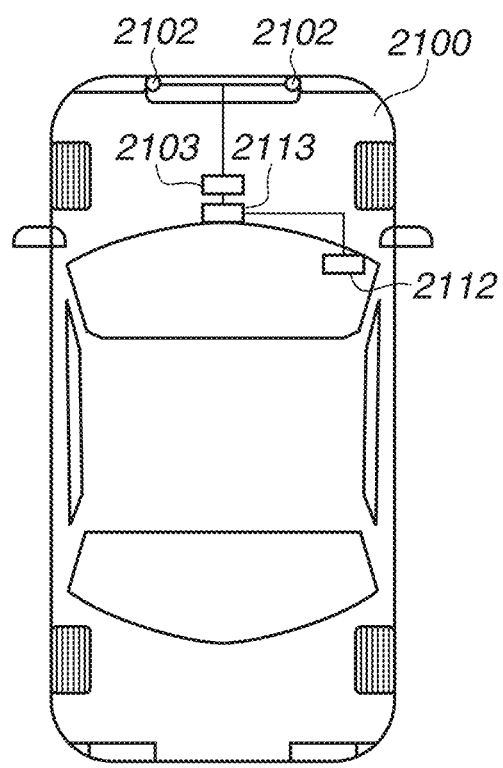
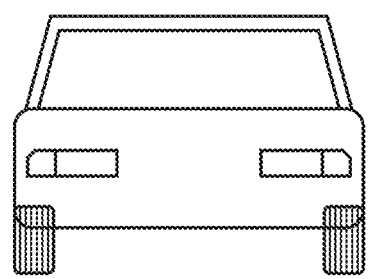

SIGNAL PROCESSING APPARATUS, PHOTOELECTRIC CONVERSION APPARATUS, IMAGING APPARATUS, AND MOVING BODY

BACKGROUND

Field

The present disclosure relates to a signal processing apparatus, a photoelectric conversion apparatus, an imaging apparatus, and a moving body.

Description of the Related Art

A signal processing apparatus that performs analog-to-digital (AD) conversion to obtain a plurality of digital signals from a single analog signal has been known. Japanese Patent Application Laid-Open No. 2010-252140 discusses a complementary metal-oxide-semiconductor (CMOS) image sensor including a plurality of pixels and a plurality of AD conversion circuits. The CMOS image sensor is a mode of a photoelectric conversion apparatus and is a mode of a signal processing apparatus performing signal processing, such as AD conversion inside. In the photoelectric conversion apparatus discussed in Japanese Patent Application Laid-Open No. 2010-252140, a plurality of AD conversion circuits is connected to a pixel column. The plurality of AD conversion circuits each converts a common analog signal output from a pixel into a digital signal. Such processing for performing a plurality of AD conversions on a pixel signal is sometimes referred to as multi-sampling AD conversion or simply as multi-sampling.

However, the signal processing apparatus discussed in Japanese Patent Application Laid-Open No. 2010-252140 still has room for performance improvement.

For example, it is difficult for the signal processing apparatus discussed in Japanese Patent Application Laid-Open No. 2010-252140 to select a method of signal processing based on the result of the AD conversion or select the presence or absence of signal correction based on the result of the AD conversion.

Prior art techniques may suffer disadvantages such as reduced image quality, noisy data, and inaccurate calculation results.

For example, in the CMOS image sensor discussed in Japanese Patent Application Laid-Open No. 2010-252140, the plurality of AD conversion circuits is provided with a plurality of ramp signals different from each other. The plurality of ramp signals is offset by certain voltages at the same time. Depending on the amounts of offset, some but not all of the plurality of digital signals (digital data) obtained by the AD conversions can be saturated. In such a case, data calculation such as arithmetic average processing on the multi-sampled digital data fails to provide an accurate average result. This can sometimes result in a drop in image quality.

Aside from the saturation of AD-converted data, there is a possibility that accurate AD conversion is unable to be performed because of the occurrence of noise or a surge in some of the AD conversion circuits. Consequently, the result of the data calculation on the AD-converted digital data can be inaccurate.

SUMMARY

A signal processing apparatus includes an analog-to-digital conversion unit, a determination unit, and a data calculation unit. The analog-to-digital conversion unit is configured to perform a plurality of analog-to-digital conversions on one analog signal to generate at least a plurality of digital signals including a first digital signal and a second digital signal, first noise digital data, and second noise digital data. The determination unit is configured to perform a determination on at least one of the plurality of digital signals. The determination unit includes a comparator configured to compare the digital signal subjected to the determination with a threshold. The data calculation unit is configured to perform calculation using the first and second digital signals. The data calculation unit is configured to generate a first calculation result by performing calculation including processing for averaging the first and second digital signals or processing for adding the first and second digital signals. The data calculation unit is configured to generate a second calculation result based on a difference between the first digital signal and the first noise digital data. The data calculation unit is further configured to switch whether to output the first calculation result or output the second calculation result, based on a comparison result of the comparator, is provided.

According to some other embodiments, an imaging apparatus includes a pixel unit, an analog-to-digital conversion unit; a comparator, and a data calculation unit. The pixel unit includes a plurality of pixels arranged in a matrix including a plurality of rows and a plurality of columns. The analog-to-digital conversion unit is configured to perform a plurality of analog-to-digital conversions on a signal to generate at least first digital data and second digital data and perform a plurality of analog-to-digital conversions on a noise signal to generate at least first noise digital data and second noise digital data. The signal is based on incident light and generated by a first pixel of the pixel unit. The noise signal is generated by the first pixel. The comparator is configured to compare at least the second digital data with a threshold. The data calculation unit is configured to perform calculation using the first digital data and the second digital data. The data calculation unit is configured to generate a first calculation result by performing calculation including processing for averaging the first digital data and the second digital data or processing for adding the first digital data and the second digital data. The data calculation unit is configured to generate a second calculation result based on a difference between the first digital data and the first noise digital data. The data calculation unit is further configured to switch whether to output first calculation result or output the second calculation result, based on a comparison result of the comparator, is provided.

Further features of the disclosure will become apparent from the following description of exemplary embodiments with reference to the attached drawings.

BRIEF DESCRIPTION OF THE DRAWINGS

FIG. 2 is a block diagram schematically illustrating a configuration of an imaging apparatus.

FIG. 3 is a diagram schematically illustrating a configuration of a pixel unit and peripheral circuits in the imaging apparatus.

FIGS. 8A, 8B, and 8C are a timing chart for describing an operation of the imaging apparatus.

FIGS. 14A, 14B, and 14C are a timing chart for describing an operation of the imaging apparatus.

FIGS. 15A, 15B, and 15C are a timing chart for describing an operation of the imaging apparatus.

FIG. 16A is a diagram schematically illustrating an appearance and main internal structures of a moving body.

DESCRIPTION OF THE EMBODIMENTS

Exemplary embodiments of the present disclosure will be described in detail below with reference to the drawings. The present disclosure is not limited to the exemplary embodiments described below. Modifications made by modifying a configuration of part of the following exemplary embodiments without departing from the gist of the present disclosure also constitute exemplary embodiments of the present disclosure. Examples where a configuration of part of or any of the following exemplary embodiments is added to another exemplary embodiment or replaced with a configuration of part of another exemplary embodiment also constitute exemplary embodiments of the present disclosure. An element may be referred to as a unit or circuit. The circuit may include analog or digital components arranged to perform a specified function. The components may include semiconductor devices (e.g., transistors, diodes) constructed to operate as a circuit. The circuit may also be an arithmetic or logical circuits to perform arithmetic or logical operations such as additions, subtractions, AND, OR. In one embodiment, a unit may refer to a module or a functionality that is performed by a processor executing a program or instructions stored in a memory device or circuit to carry out a specified operation.

Figure 1A:
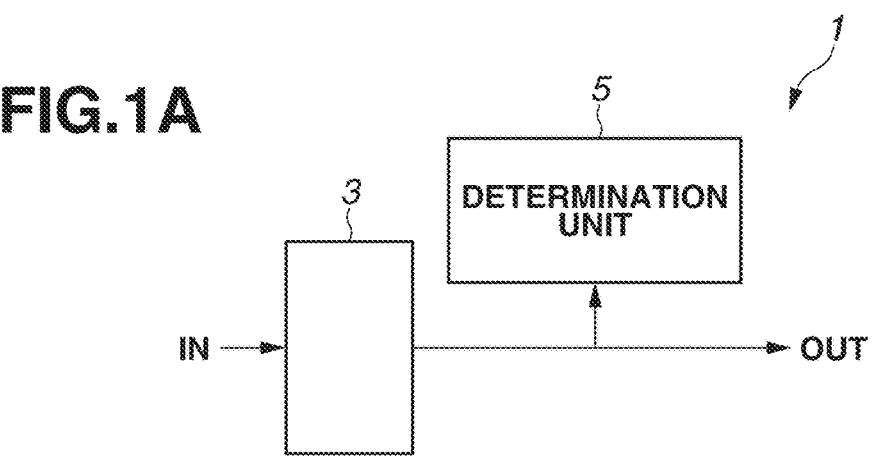
FIGS. 1A to 1C are diagrams schematically illustrating configurations of a signal processing apparatus.
Figure 1B:
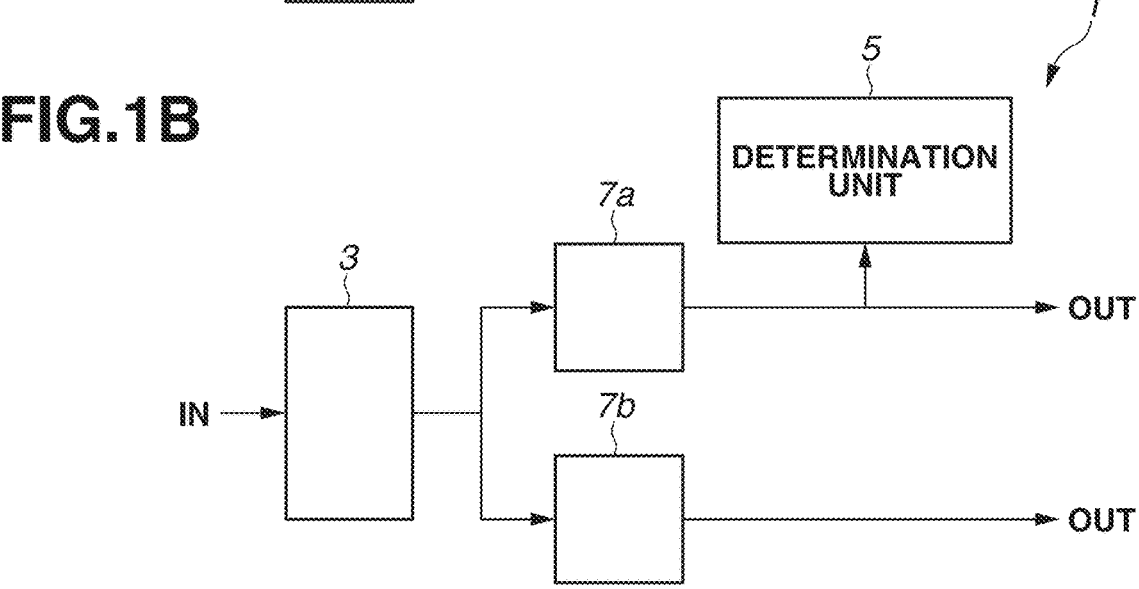
Figure 1C:
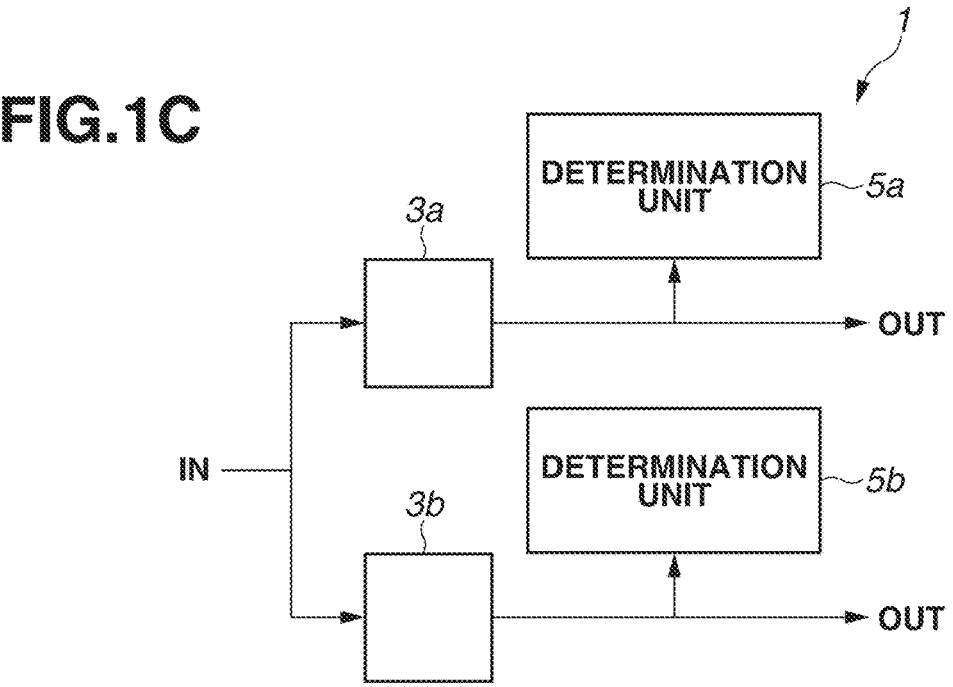

A signal processing apparatus according to a first exemplary embodiment of the present disclosure will be described. FIGS. 1A to 1C schematically illustrate configurations of a signal processing apparatus 1 according to the present exemplary embodiment. The signal processing apparatus 1 illustrated in FIG. 1A includes an analog-to-digital (AD) converter or conversion unit or conversion circuit 3 and a determination unit or circuit 5.

The AD conversion unit 3 performs a plurality of AD conversions on an analog signal (analog data) input from a node IN. As a result, the AD conversion unit 3 receiving the input of an analog signal outputs more digital signals (pieces of digital data) than the number of input signals. In the signal processing apparatus 1 illustrated in FIG. 1A, the AD conversion unit 3 receives one analog signal and sequentially outputs two or more digital signals that are the converted results of the one analog signal.

The determination unit or circuit 5 performs determination processing on at least part of the plurality of digital signals output from the AD conversion unit 3. The determination processing can be performed on only some of the plurality of digital signals. For example, the determination processing is performed on either one of two digital signals and not on the other. Alternatively, the determination processing can be performed on all the plurality of digital signals. A digital signal typically includes a plurality of bit signals. The determination processing may be performed on only some of the plurality of bit signals (for example, only the most significant bit signal) included in a digital signal. Alternatively, the determination processing may be performed on only some of the bit signals in each of the plurality of digital signals.

With such a configuration, the signal processing apparatus 1 can perform certain determination processing on the digital signals obtained by the AD conversions. As a result, the performance of the signal processing can be improved.

For example, as the determination processing, the determination unit 5 determines whether a digital signal is odd value or even value. This improves the performance of signal processing, for example, by enabling the signal processing on only odd or even digital signals. Whether a digital signal is odd value or even value can be determined by various methods. For example, the determination may be performed based on the least significant bit signal.

For example, as the determination processing, the determination unit 5 determines whether a digital signal include an error or the probability of an error being included. This enables the signal processing apparatus 1 or the user of the signal processing apparatus 1 to determine reliability of the result of the signal processing. Alternatively, the signal processing apparatus 1 can change the subsequent signal processing based on the presence or absence of an error or the probability of an error. Such signal processing is thus of high performance compared to signal processing where no error-related information is output. In other words, the determination unit 5 improves the performance of the signal processing.

An error can be determined by using various methods. For example, an error can be determined by comparing an obtained digital signal with another digital signal expected to be likely to have a close signal value. The AD conversion unit 3 according to the present exemplary embodiment outputs a plurality of digital signals for the same analog signal. An error can thus be accurately determined by comparing the plurality of digital signals with each other. As another method, the determination unit 5 performs inverse conversion on the obtained digital signals. Specifically, the determination unit 5 converts the digital signals into analog signals. The determination unit 5 then determines an error by comparing the analog signal input to the AD conversion unit 3 with the analog signals obtained by the inverse conversion. Moreover, the determination unit 5 may include a trained model generated by machine learning or deep learning. The digital signals are input to the trained model, and the trained model outputs a signal indicating the presence or absence of an error or the probability of an error.

For example, as the determination processing, the determination unit 5 calculates an error correction code for the digital signals. This enables the signal processing apparatus 1 to output the result of the signal processing along with the error correction code. In other words, the determination unit 5 improves the performance of the signal processing. An error correction code can be calculated by using various conventional techniques.

For example, as the determination processing, the determination unit 5 compares a digital signal with a predetermined threshold. The signal processing apparatus 1 can change the subsequent signal processing based on the comparison result. In other words, this enables signal processing of higher performance. For example, the signal processing apparatus 1 can perform processing for adding a plurality of digital signals. Here, in a case where it is determined that the digital signals are greater than a predetermined threshold, some of the digital signals are excluded from the addition processing to prevent the added result from overflowing. In another example, in a case where a digital signal is greater than a predetermined threshold, the signal value of the analog signal can be determined to have reached a saturation level, i.e. not reflect correct information. Such a digital signal can be excluded from the subsequent processing (such as the foregoing addition processing), or subjected to correction or replacement processing.

The usage of the determination result of the determination unit 5 is not limited to the foregoing. The signal processing apparatus 1 can change the procedure of the subsequent signal processing based on the determination result. Such processing is an example of the signal processing of improved performance. Alternatively, the signal processing apparatus 1 displays the determination result to the user or notifies the user of the determination result. Since the user can obtain information about the reliability of the signal processing or other additional information, such processing is an example of the signal processing of improved performance. Alternatively, the signal processing apparatus 1 can also improve the performance of the signal processing by simply storing data indicating the determination result in an internal or external memory. For example, in a case where the determination unit 5 determines an error, a reliability (the frequency of errors relative to the number of times of AD conversions) related evaluation can be performed by analyzing the data indicating the determination result. The signal processing capable of quantitative evaluation is signal processing of improved performance. Since the determination result can thus be used in many modes of application, the performance of the signal processing can be improved by the determination unit 5 performing the determination processing.

In the present exemplary embodiment, the analog signal input to the AD conversion unit or circuit 3 is not limited in particular. For example, an analog signal generated by a sensor is input. Examples of the applicable sensor include a sound sensor, a vibration sensor, a temperature sensor, a pressure sensor, an optical sensor, an acceleration sensor, a brain wave sensor, and a living body sensor. Such sensors convert a physical quantity into an electrical signal. Examples of the optical sensor include a charge-coupled device (CCD) image sensor, a complementary metal-oxide-semiconductor (CMOS) image senor, a time-of-flight (ToF) sensor, and an infrared sensor.

The AD conversion unit or circuit 3 performs AD conversions such as sloped AD conversion, successive approximation AD conversion, pipelined AD conversion, and recursive AD conversion. The AD conversion unit 3 typically includes a comparator. Aside from the comparator, the AD conversion unit 3 can include components to be used based on the AD conversion format.

Next, variations of the configuration for outputting a plurality of digital signals according to the present exemplary embodiment will be described. The signal processing apparatus 1 illustrated in FIG. 1B includes a plurality of memory units, devices, or circuits 7 connected to the AD conversion unit 3 in addition to the AD conversion unit 3 and the determination unit 5. While FIG. 1B illustrates two memory units 7a and 7b, the number of memory units 7 may be three or more. Each of the plurality of memory units 7 stores at least one digital signal output from the AD conversion unit 3. Simultaneously inputting a digital signal into the plurality of memory units 7 enables the plurality of memory units 7 to store the digital signal each. Alternatively, as described in FIG. 1A, the AD conversion unit 3 can perform a plurality of AD conversions on an analog signal in succession. The plurality of digital signals output in succession may be stored into the plurality of memory units 7 in order. In such a case, a multiplexer and/or a switch circuit can be inserted between the AD conversion unit 3 and the memory units 7.

The memory units 7 and the AD conversion 3 are illustrated as separate blocks for the sake of convenience. However, the memory units 7 can be configured as part of the AD conversion unit 3, depending on the AD conversion format.

The determination unit 5 performs determination processing on the digital signal(s) stored in at least some of the memory units 7. Any of the types of determination processing described in FIG. 1A can be applied to the determination unit 5 illustrated in FIG. 1B. In FIG. 1B, the determination unit 5 is connected to only the memory unit 7a. However, the determination unit 5 may be connected to both the memory units 7a and 7B. Alternatively, another not-illustrated determination unit may be added and connected to the memory unit 7b.

The signal processing apparatus 1 illustrated in FIG. 1C includes a plurality of AD conversion units 3 connected to an input node IN. Even in such a configuration, the signal processing apparatus 1 or the AD conversion units 3 included in the signal processing apparatus 1 can perform a plurality of AD conversions on an analog signal. The signal processing apparatus 1 illustrated in FIG. 1C includes a determination unit 5a connected to an AD conversion unit 3a and a determination unit 5b connected to an AD conversion unit 3b. The AD conversion units 3a and 3b each have similar functions to those of the AD conversion unit 3 described in FIGS. 1A and 1B. The determination units 5a and 5b each have similar functions to those of the determination unit 5 described in FIGS. 1A and 1B.

In FIG. 1C, a signal processing circuit may be inserted into the previous stage of each of the AD conversion units 3a and 3b. For example, amplifiers for amplifying a signal or offset addition units for adding an offset can be inserted. Such circuits can perform different signal processing on a signal. For example, amplifiers add different gains to the analog signal input to the AD conversion unit 3a and the analog signal input to the AD conversion unit 3b. Alternatively, offset addition units add different amounts of offset to the analog signal input to the AD conversion unit 3a and the analog signal input to the AD conversion unit 3b. Despite such processing, the AD conversion units 3a and 3b can be said to perform a plurality of AD conversions on an analog signal, since the original analog signal is the same one.

For the sake of convenience, in the foregoing description, the signal processing apparatus 1 is described to include two AD conversion units 3. However, the same configuration may be interpreted as an AD conversion unit 3 including a plurality of AD conversion circuits or a plurality of AD converters. In other words, a plurality of circuits each performing AD conversion may collectively constitute one AD conversion unit 3. As employed herein, an AD converter and an AD conversion circuit are synonymous.

As described above, the signal processing apparatuses 1 illustrated in FIGS. 1A to 1C perform a plurality of AD conversions on an analog signal. The signal processing apparatuses 1 include a determination unit or units (circuit or circuits) for performing determination processing on at least part of the plurality of digital signals obtained. With such a configuration, the performance of the signal processing can be improved.

A signal processing apparatus 1 does not necessarily need to include the AD conversion unit(s) 3 as long as a unit that obtains a plurality of digital signals converted from an analog signal is included. For example, another device may generate a plurality of digital signals, and the signal processing apparatus 1 according to the present exemplary embodiment may simply receive the digital signals. The effect of the present exemplary embodiment does not depend on the agents that perform the foregoing respective processes, either. In other words, the performance of the signal processing can be improved by a method including the step of obtaining a plurality of digital signals converted from an analog signal and the step of performing determination processing on at least part of the plurality of digital signals obtained.

[Overall Configuration]

An imaging apparatus according to a second exemplary embodiment of the present disclosure will be described. The imaging apparatus according to the present exemplary embodiment is a mode of a signal processing apparatus. FIG. 2 is a block diagram schematically illustrates a configuration of an imaging apparatus 100 according to the present exemplary embodiment. For example, the imaging apparatus 100 is used as a CMOS image sensor, a ToF sensor, or an infrared sensor described in the first exemplary embodiment.

The imaging apparatus 100 is controlled by a central processing unit (CPU) 101. The imaging apparatus 100 includes a control unit or circuit 102 that operates by receiving a synchronization signal and communication from the CPU 101. The imaging apparatus 100 includes a vertical scanning unit or circuit 103 that operates by receiving control signals from the control unit 102, and a pixel unit or circuit 104 where a plurality of pixels P is arranged in an n-row m-column matrix. The vertical scanning unit 103 controls operation of the pixel unit 104. The imaging apparatus 100 further includes a column AD conversion unit or circuit 105 that processes signals from the pixel unit 104, and a horizontal transfer unit or circuit 106, a data processing unit or circuit 107, and a signal output unit or circuit 108. The column AD conversion unit 105 and the horizontal transfer unit 106 operate by receiving control signals from the control unit 102.

FIG. 3 is schematic diagram illustrating a configuration example of the pixel unit 104 and the column AD conversion unit 105 according to the present exemplary embodiment. The pixel unit 104 includes pixels 201 in each column. The pixel unit 104 also includes vertical signal lines 202 connected to the pixels 201 in the respective columns. The vertical signal lines 202 are connected to constant current sources (not illustrated). The vertical signal lines 202 are also connected to offset addition units 203. The outputs of the offset addition units 203 are connected to column AD converters 204. The outputs of the column AD converters 204 are connected to holding units 205. In other words, the column AD conversion unit 105 includes a plurality of column AD converters 204. Each column AD converter 204 has similar functions to those of the AD conversion unit 3 described in the first exemplary embodiment. The description of the AD conversion unit 3 according to the first exemplary embodiment is thus incorporated in its entirety in the present exemplary embodiment. In the present exemplary embodiment, each column is provided with a vertical signal line 202. Similarly, each column is provided with an offset addition unit 203. Each column is provided with two column AD converters 204 and two holding units 205.

To distinguish the plurality of vertical signal lines 202, in FIG. 3, the vertical signal line 202 connected to the pixels 201 in the first column is denoted by the symbol c1, and the vertical signal line 202 connected to the pixels 201 in an mth column by the symbol cm. For example, an analog signal (pixel signal) from a pixel 201 connected to the vertical signal line c1 is input to the offset addition unit or circuit 203 connected to the vertical signal line c1. In response, the offset addition unit 203 outputs a plurality of signals c1_ofst_# (#: 1 to 2). Signals offset by an offset addition unit 203 will also be referred to as offset signals. The offset addition unit 203 can include amplification circuits, such as a column amplifier, or attenuator circuits. Alternatively, a configuration capable of adding or subtracting signal values of analog signals can be used.

The signals (output signals) c1_ofst_# of the offset addition unit 203 are input to the respective column AD converters 204. The column AD converters 204 are blocks for converting analog data into digital data. The column AD converters 204 according to the present exemplary embodiment include a comparator, a ramp wave generator, and a counter each. The ramp wave generator and the counter may be shared by a plurality of column AD converters 204.

The outputs of the column AD converters 204 are connected to the inputs of the holding units or circuits 205. The holding units 205 have similar functions to those of the memory unit(s) 7 according to the first exemplary embodiment. The holding units 205 may be omitted. The holding units 205 output signals adout_c1_# (#: 1 to 2). The signals adout_c1_# are digital signals (digital data) and include a plurality of bit signals each.

[Pixel Circuit]

Figure 4:
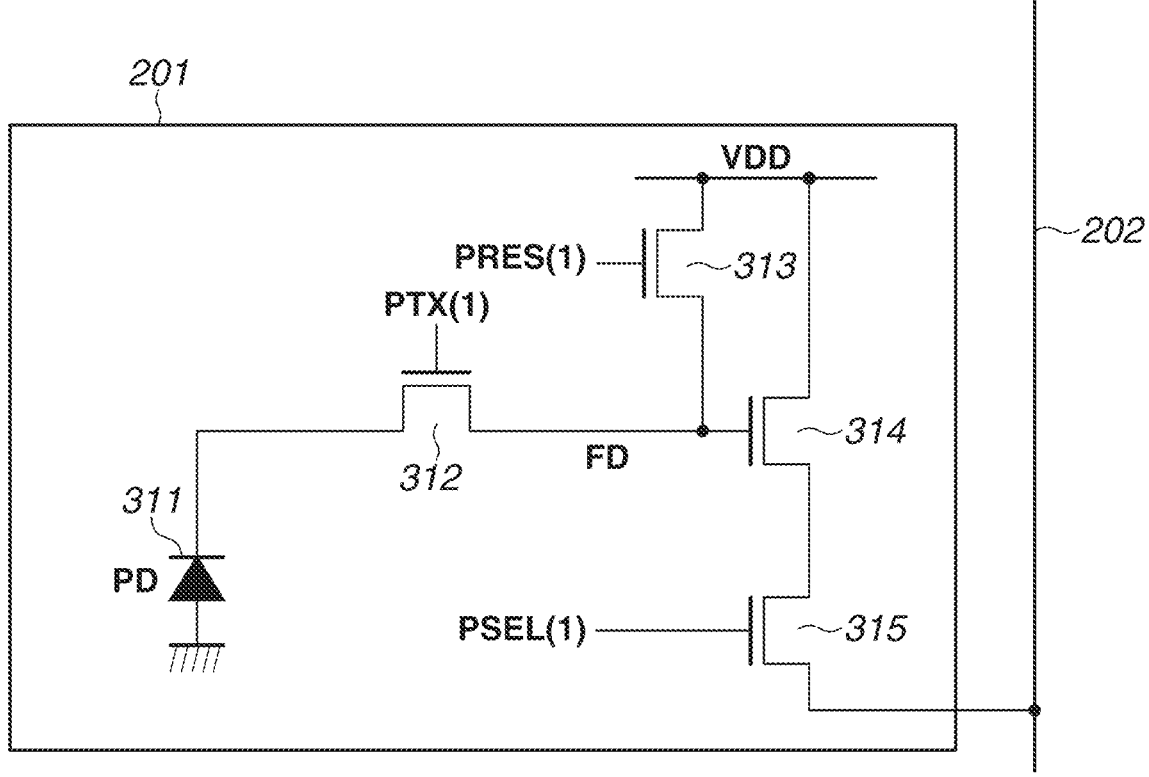
FIG. 4 is an equivalent circuit diagram of a pixel.

FIG. 4 is a diagram illustrating an equivalent circuit of a pixel 201 according to the present exemplary embodiment. The pixel 201 includes a photoelectric conversion element (photodiode (PD)) 311, a charge transfer unit or circuit 312, a floating diffusion portion FD, a resetting unit or circuit 313, a signal amplification unit or circuit 314, and a row selection unit or circuit 315. The photoelectric conversion element (PD) 311 includes an element, such as a PD, for generating a charge based on the amount of light incident on the photoelectric conversion element 311.

The charge transfer unit 312 is connected between the photoelectric conversion element (PD) 311 and the floating diffusion portion FD. The charge transfer unit 312 is a transfer transistor for reading the charge accumulated in the photoelectric conversion element (PD) 311. Conduction and non-conduction (on and off) of the charge transfer unit 312 are controlled by a pixel transfer signal PTX(1).

The resetting unit 313 is connected between a power supply voltage VDD and the floating diffusion portion FD. The resetting unit 313 is a resetting transistor for supplying the power supply voltage VDD to the floating diffusion portion FD to reset the circuit. Conduction and non-conduction (on and off) of the resetting unit 313 are controlled by a pixel unit reset signal PRES(1).

The floating diffusion portion FD is connected to the gate terminal of the signal amplification unit 314. The power supply voltage VDD and the row selection unit 315 are connected to the drain and source terminals. The signal amplification unit 314 is a source-follower transistor for converting the charge accumulated in the floating diffusion portion FD into a voltage, amplifying the voltage, and outputting the amplified voltage as a voltage signal to the vertical signal line 202.

The row selection unit 315 is connected between the output of the signal amplification unit 314 and the vertical signal line 202. The row selection unit 315 is a transistor for selecting the row to output a pixel signal. Conduction and non-conduction (on and off) of the row selection unit 315 are controlled by a row selection signal PSEL(1).

[Horizontal Transfer Unit]

Figure 5:
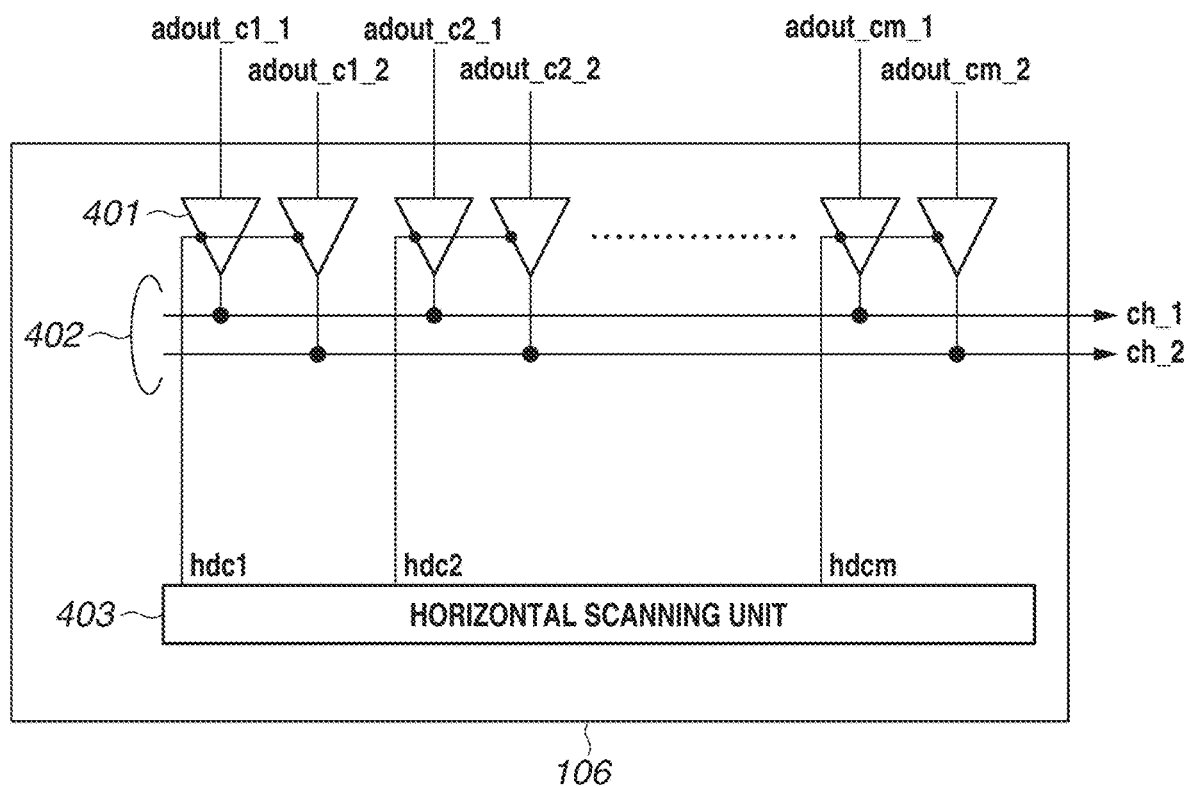
FIG. 5 is a diagram schematically illustrating a configuration of a horizontal transfer unit.

FIG. 5 is a diagram illustrating a configuration example of the horizontal transfer unit 106 according to the present exemplary embodiment. The horizontal transfer unit 106 includes a plurality of three-state buffers 401, horizontal transfer lines 402, and a horizontal scanning unit 403.

The signals adout_cM_# (M: 1 to m) (#: 1 to 2) output from the column AD conversion unit 105 are connected to the inputs of the respective three-state buffers 401. The outputs of the three-state buffers 401 are connected to the horizontal transfer lines 402. The outputs of the three-state buffers 401 are controlled by the horizontal scanning unit 403. The three-state buffers 401 can select to "simply output their input signal" or to "output no signal (high impedance state)".

In the present exemplary embodiment, each column is provided with two channels (ch) of horizontal transfer lines 402. The signal adout_cM_1 is connected to a horizontal transfer line 402 ch_1 via a three-state buffer 401, and the signal adout_cM_2 is connected to a horizontal transfer line 402 ch_2 via another three-state buffer 401.

[Data Processing Unit]

Figure 6:
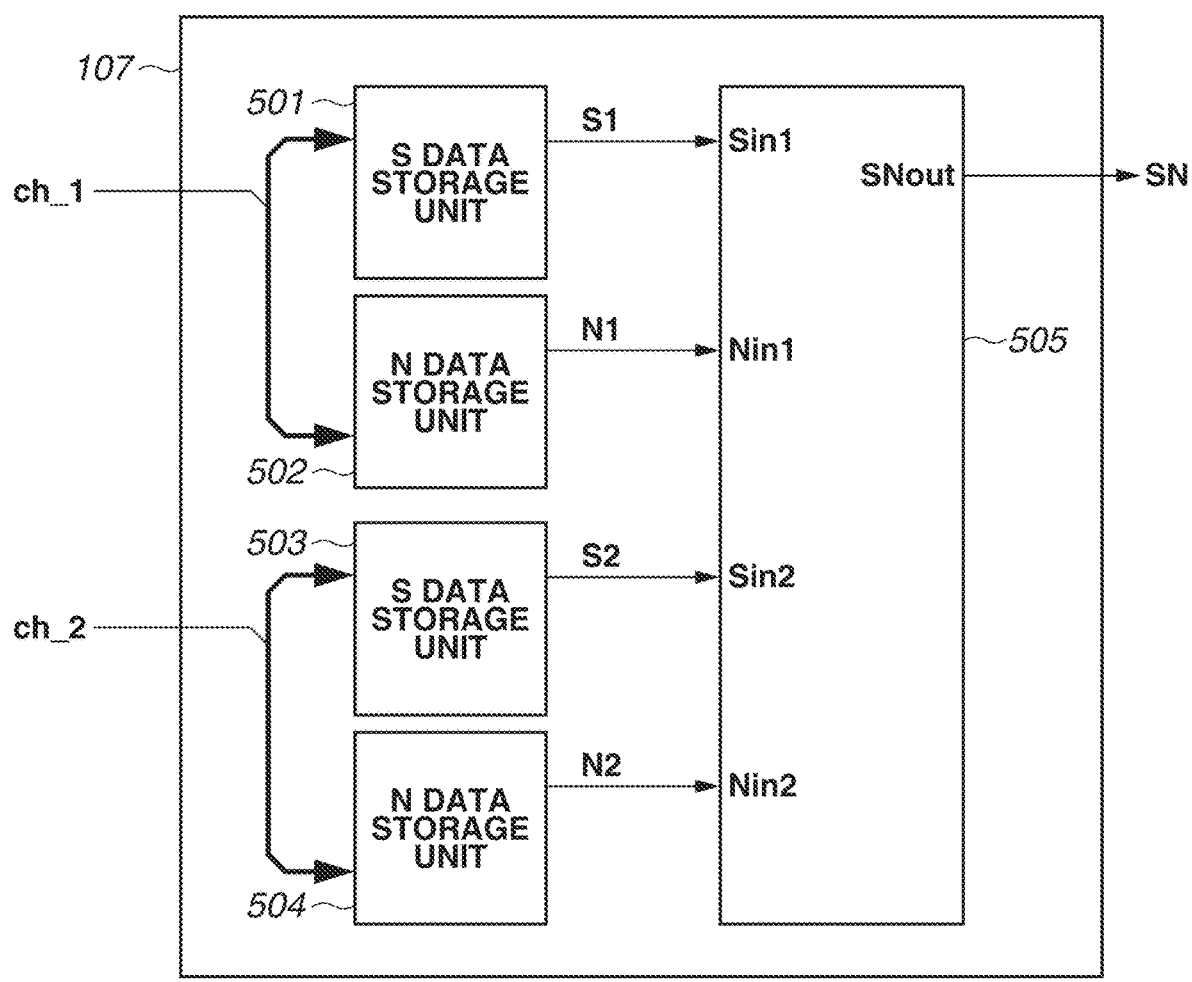
FIG. 6 is a block diagram schematically illustrating a configuration of a data processing unit.

FIG. 6 is a diagram illustrating a configuration example of the data processing unit 107 according to the present exemplary embodiment. The data processing unit 107 includes S data storage units or circuits 501 and 503, N data storage units or circuits 502 and 504, and a data calculation unit or circuit 505. N data and S data are two signals obtained to perform correlated double sampling (CDS) in the imaging apparatus 100. Two pieces of analog data output from a pixel 201 are individually AD-converted into N data and S data. S data refers to digital data obtained by performing AD conversion on a signal (light signal) based on incident light to be described below. N data refers to noise digital data obtained by performing AD conversion on a noise signal to be described below.

The input (horizontal transfer line) ch_1 to the data processing unit 107 is connected to both the S data storage unit 501 and the N data storage unit 502. The S data storage unit 501 includes an output port S1. The output port S1 is connected to the data calculation unit 505. The N data storage unit 502 includes an output port N1. The output port N1 is connected to the data calculation unit 505.

Similarly, the input (horizontal transfer line) ch_2 to the data processing unit 107 is connected to both the S data storage unit 503 and the N data storage unit 504. The S data storage unit 503 includes an output port S2. The output port S2 is connected to the data calculation unit 505. The N data storage unit 504 includes an output port N2. The output port N2 is connected to the data calculation unit 505.

The data calculation unit 505 performs calculation based on input data Sin1, Nin1, Sin2, and Nin2. The data calculation unit 505 outputs the calculation result to a port SN.

The S data storage units 501 and 503 and the N data storage units 502 and 504 can include a static random access memory (SRAM) each. Within an acceptable circuit scale, the data storage units 501 to 504 can include flip-flops. The data storage units 501 to 504 may be other storage elements.

The data calculation unit 505 includes a detection unit or circuit 611 (see FIG. 7A) that detects an anomaly or error in the data values of the AD-converted input data Sin1, Sin2, Nin1, and Nin2. The detection unit 611 determines the presence or absence of an error or the probability of occurrence of an error from the data values of the input data Sin1, Sin2, Nin1, and Nin2. In other words, the detection unit 611 is an example of the determination unit 5 according to the first exemplary embodiment. The data calculation unit 505 includes a unit (selector 608 to be described below) that, in a case where an error is detected by the detection unit 611, disables use of the data including the error. The data calculation unit 505 thus provides an appropriate data calculation result even in a case where the AD-converted data includes an abnormal value due to reasons such as a surge, for example.

Figure 7A:
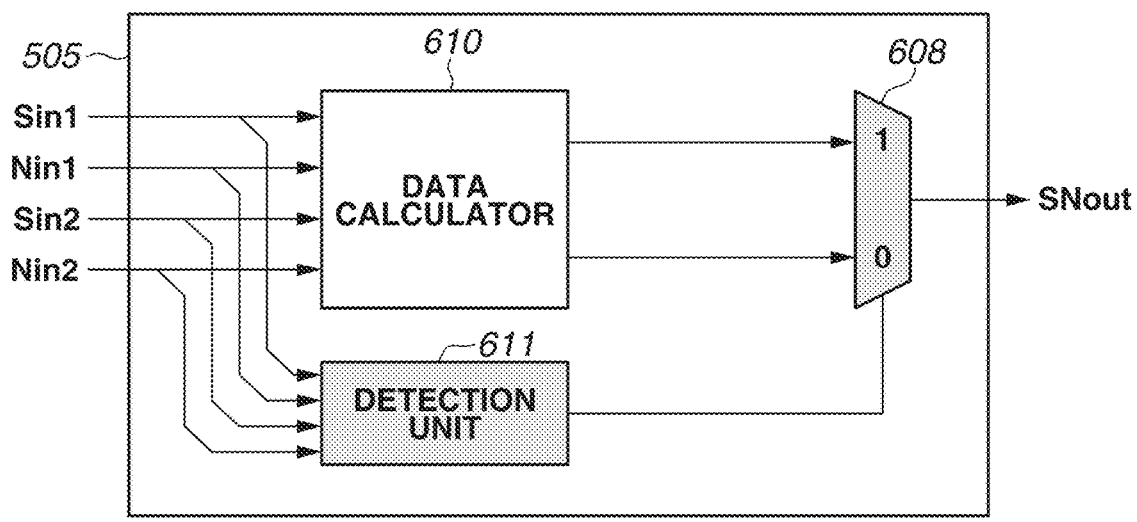
FIGS. 7A and 7B are block diagrams schematically illustrating a configuration of a data calculation unit.

FIG. 7A illustrates a circuit configuration of the data calculation unit 505. The data calculation unit 505 includes the detection unit or circuit 611 and a data calculator or calculating circuit 610. The detection unit 611 detects an anomaly or error from the data values of the input data Sin1, Sin2, Nin1, and Nin2. The data calculator 610 performs various data calculations on the input data Sin1, Sin2, Nin1, and Nin2. The data calculation unit 505 further includes a selector 608 that switches between two output results of the data calculator 610 based on the determination result of the detection unit 611.

Figure 7B:
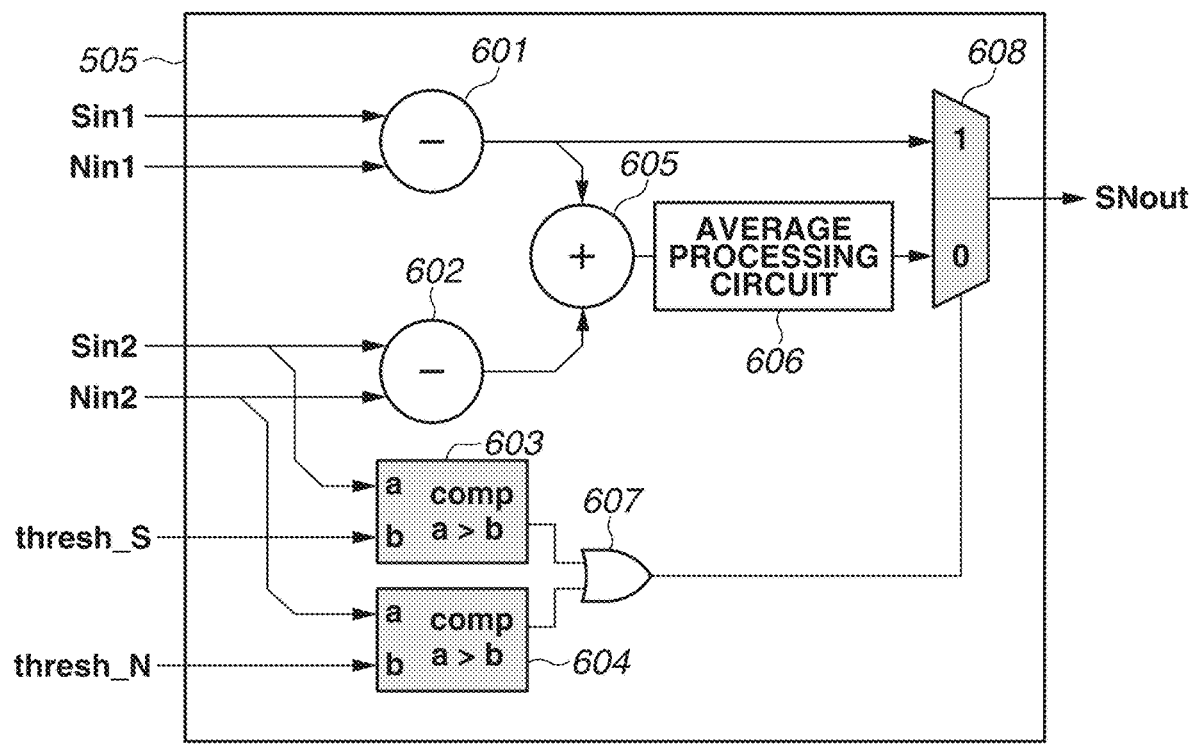

FIG. 7B illustrates an example of processing of the data calculator 610 and the detection unit 611. In the example of FIG. 7B, the data calculator 610 averages the S data and the N data. The detection unit 611 performs a determination by comparing the input data Sin2 and Nin2 with thresholds.

The data calculation unit 505 initially obtains a difference between the input data Sin1 and the input data Nin1, or Sin1−Nin1. In a case where the input data Sin2 is greater than a threshold thresh_S or the input data Nin2 is greater than a threshold thresh_N, the data calculation unit 505 outputs the difference between the input data Sin1 and the input data Nin1. Here, an output SNout is expressed by the following Eq. 1:

$$SNout = Sin1 - Nin1 \quad (Eq.\ 1),$$

where Sin2>thresh_S or Nin2>thresh_N.

The data calculation unit 505 also obtains a difference between the input data Sin2 and the input data Nin2, or Sin2−Nin2. In a case where the input data Sin2 is less than or equal to the threshold thresh_S and the input data Nin2 is less than or equal to the threshold thresh_N, the data calculation unit 505 outputs an average of the differences Sin1−Nin1 and Sin2−Nin2. Here, the output SNout is expressed by the following Eq. 2:

$$SNout = \{(Sin1 - Nin1) + (Sin2 - Nin2)\}/2 \quad (Eq.\ 2),$$

where Sin2<thresh_S and Nin2<thresh_N.

A circuit configuration for performing the foregoing calculation will be described in detail. The data calculation unit 505 includes subtractors 601 and 602, comparators 603 and 604, an adder 605, an average processing circuit 606, an OR circuit 607, and the selector 608.

The subtractor 601 inputs the input data Sin1 and Nin1, and outputs the result of subtraction of the input data Nin1 from the input data Sin1. The subtractor 602 inputs the input data Sin2 and Nin2, and outputs the result of subtraction of the input data Nin2 from the input data Sin2. The adder 605 adds the outputs of the subtractors 601 and 602, and outputs the result. The average processing circuit 606 outputs the result of division of the output of the adder 605 by 2. The average processing circuit 606 is a circuit for determining an average based on the number of pieces of input data. The average processing circuit 606 may be constituted by a divider as described above, or may be constituted by a shifter circuit in a case where the number of pieces of input data is a power of 2. Alternatively, the average processing circuit 606 may be omitted and the result determined by the adder 605 may be output. The comparator 603 compares the input data Sin2 with the threshold thresh_S. The comparator 603 outputs a high level in a case where the input data Sin2 is greater than the threshold thresh_S, and outputs a low level in the other cases. The comparator 604 compares the input data Nin2 with the threshold thresh_N. The comparator 604 outputs a high level in a case where the input data Nin2 is greater than the threshold thresh_N, and outputs a low level in the other cases. The OR circuit 607 inputs the outputs of the comparators 603 and 604, and outputs the logical OR of the outputs. The selector 608 selects either the output of the subtractor 601 or the output of the average processing circuit 606 based on the output level of the OR circuit 607, and outputs the selected output as SNout.

As described above, in the present exemplary embodiment, the detection unit 611 including the comparator 603 serves as a determination unit. The selector 608 switches the data to be output based on the output of the detection unit 611. In such a manner, the method of signal processing is changed based on the result output from the determination unit. As a modification, the selector 608 may be omitted and the presence or absence of an error may be separately output to outside.

[Driving Method]

Figure 8A:
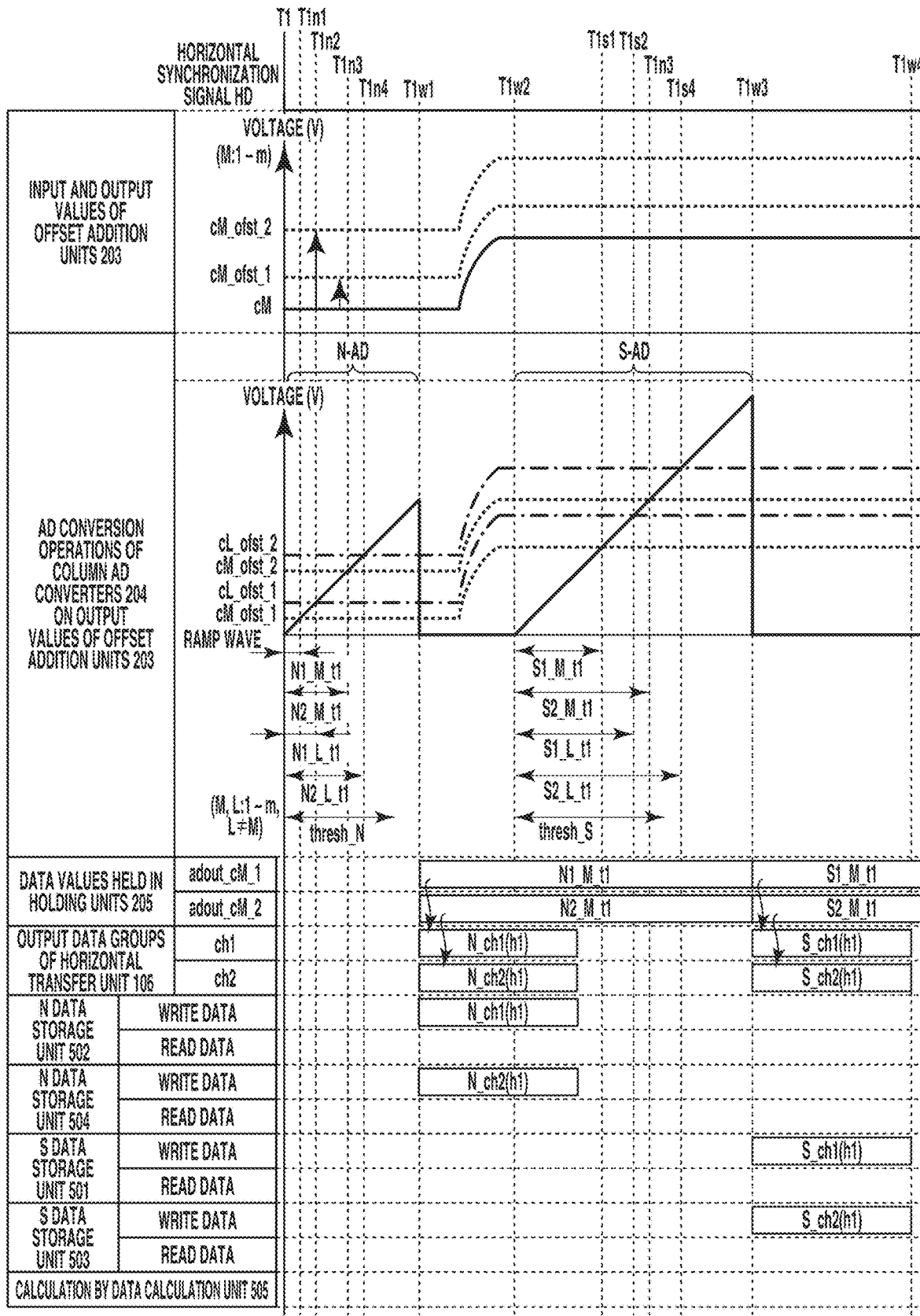
Figure 8C:
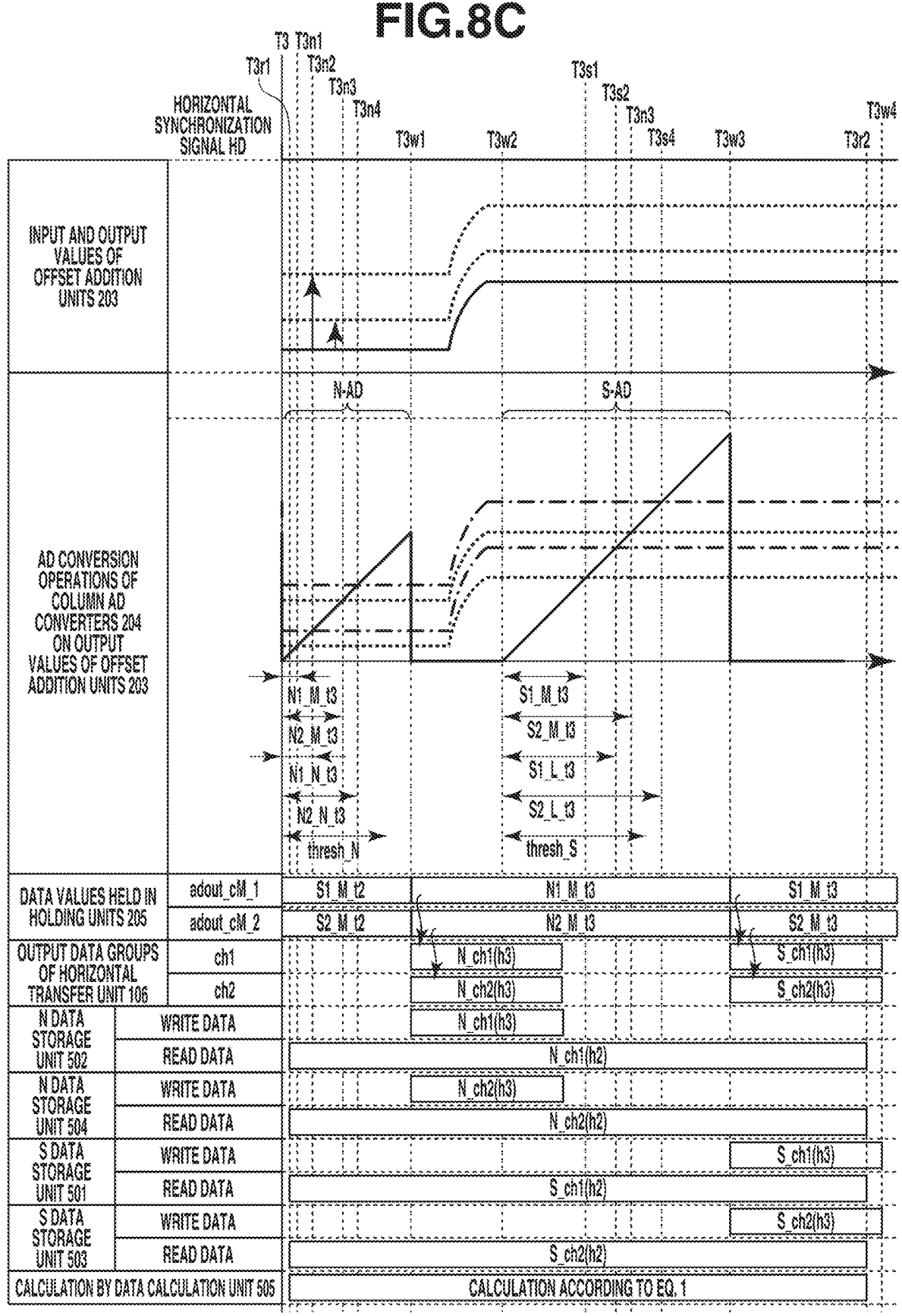

Next, a driving method of the imaging apparatus 100 according to the present exemplary embodiment will be described. FIGS. 8A, 8B, and 8C are a timing chart illustrating an example of operation of the column AD conversion unit 105, the horizontal transfer unit 106, and the data processing unit 107. The imaging apparatus 100 according to the present exemplary embodiment performs AD conversion row by row, and sequentially outputs data pixel by pixel. Such operations will be described. As an overall procedure, (1) an operation for obtaining digital data and storing the digital data in a memory (S and N data storage units 503 and 504), (2) an operation for reading the digital data from the memory, and (3) a calculation operation on the data read from the memory will be described in order.

Initially, a description will be given of an operation for AD-converting the output signals of the pixels 201 in the first row and writing the resulting data into the S data storage units 501 and 503 and the N data storage units 502 and 504 of the data processing unit 107.

At time T1, the CPU 101 outputs a horizontal synchronization signal HD to the control unit 102. Receiving the horizontal synchronization signal HD, the control unit 102 controls the vertical scanning unit 103. By the control, the pixel unit 104 outputs N (noise) signals to vertical signal lines cM (M: 1 to m) in all the columns at the same time. The N signals are signals obtained by cancelling the resetting of the floating diffusion portions FD and then reading the charges in the floating diffusion portions FD via the signal amplification units 314. The offset addition units 203 add offsets to the signals of the vertical signal lines cM (M: 1 to m). Each offset addition unit 203 outputs signals cM_ofst_1 and cM_ofst_2 to which offsets of respective different values are added. As illustrated in FIG. 8A, the values of the offsets to be added are such that cM_ofst_1<cM_ofst_2.

By the addition of the offsets, an N signal is turned into two signals having different offset values. However, the added offsets are eventually removed. Like the example described with reference to FIG. 1C of the first exemplary embodiment, the imaging apparatus 100 according to the present exemplary embodiment thus performs a plurality of AD conversions on an analog signal (pixel signal). In other words, the imaging apparatus 100 according to the present exemplary embodiment includes a configuration such that processing circuits for performing respective different processes are inserted between the input node IN and the respective AD conversion units 3a and 3b in FIG. 1C of the first exemplary embodiment.

From time T1 to time T1w1, the column AD converters 204 AD-convert the outputs (signals) cM_ofst_# (M: 1 to m) (#: 1 to 2) of the offset addition units 203 in all the columns at the same time. In FIG. 8A, an AD conversion period for the signals obtained by adding the offsets to the N signals is denoted as N-AD. Specifically, at time T1, the column AD converters 204 start to generate ramp waves and operate their counters. At time T1n1, the signals cM_ofst_1 intersect the voltages of the ramp waves, and counter values N1_M_t1 (M: 1 to m) at that point in time are output from the column AD converters 204 as digital data. At time T1n3, the signals cM_ofst_2 intersect the voltages of the ramp waves, and counter values N2_M_t1 (M: 1 to m) at the point in time are output from the column AD converters 204 as digital data.

In the present exemplary embodiment, by adding the offsets, the offset-added data (offset signals) have the relationship of cM_ofst_1<cM_ofst_2. The results of AD conversion (counter values) N1_M_t1 of the signals cM_ofst_1 and the results of AD conversion (counter values) N2_M_t1 of the signals cM_ofst_2 during the AD conversion period N-AD thus satisfy the relationship of N1_M_t1<N2_M_t1.

At time T1w1, all the data is simultaneously transferred to the holding units 205. The data transferred here includes a data group N_ch1(h1) obtained by the AD conversion of the signals cM_ofst_1 and a data group N_ch2(h1) obtained by the AD conversion of the signals cM_ofst_2. From time T1w1 to T1w2, the data groups N_ch #(h1) (#: 1 to 2) in the holding units 205 are transferred to the data processing unit 107 via the horizontal transfer unit 106 pixel by pixel. The data group N_ch1(h1) is sequentially written to the N data storage unit 502. The data group N_ch2(h1) is sequentially written to the N data storage unit 504. FIG. 8A illustrates that the data groups N_ch #(h1) (#: 1 to 2) are written to the N data storage units 502 and 504 during the period from time T1w1 to time T1w2.

Next, at time T1w2, as with the output of the N signals, the pixels 201 output S signals (light signals) to the vertical signal lines 202 cM (M: 1 to 2) in all the columns at the same time. The S signals are signals obtained by transferring the charges in the photoelectric conversion elements (PD) 311 to the floating diffusion portions FD by the charge transfer units 312 and reading the charges in the floating diffusion portions FD at that time via the signal amplification units 314. In other words, the S signals are signals based on the incident light. The offset addition units 203 add offsets to the signals of the vertical signal lines 202 cM (M: 1 to m) in the respective columns at the same time. As illustrated in FIG. 8A, the values of the offsets to be added are such that cM_ofst_1<cM_ofst_2.

From time T1w2 to time T1w3, the column AD converters 204 AD-convert the outputs cM_ofst_# (M: 1 to m) (#: 1 to 2) of the offset addition units 203 in all the columns at the same time. In FIG. 8A, the AD conversion period for the signals obtained by adding offsets to the S signals is denoted as S-AD. Specifically, at time T1w2, the column AD converters 204 start to generate ramp waves and operate their counters. At time T1s1, the signals cM_ofst_1 intersect the voltages of the ramp waves, and counter values S1_M_t1 (M: 1 to m) at that point in time are output from the column AD converters 204 as digital data. At time T1s3, the signals cM_ofst_2 intersect the voltages of the ramp waves, and counter values S2_M_t1 (M: 1 to m) at that point in time are output from the column AD converters 204 as digital data.

In the present exemplary embodiment, by adding the offsets, the offset-added data (offset signals) satisfy the relationship of cM_ofst_1<cM_ofst_2. The results of AD conversion (counter values) S1_M_t1 of the signals cM_ofst_1 and the results of AD conversion (counter values) S2_M_t1 of the signals cM_ofst_2 during the AD conversion period S-AD thus satisfy the relationship of S1_M_t1<S2_M_t1.

At time T1w3, all the data is simultaneously transferred to the holding units 205. The data transferred here includes a data group S_ch1(h1) obtained by the AD conversion of the signals cM_ofst_1 and a data group S_ch2(h1) obtained by the AD conversion of the signals cM_ofst_2. From time T1w3 to time T1w4, the data groups S_ch #(h1) (#: 1 to 2) in the holding units 205 are transferred to the data processing unit 107 via the horizontal transfer unit 106 pixel by pixel. The data group S_ch1(h1) is sequentially written to the S data storage unit 501. The data group S_ch2(h1) is sequentially written to the S data storage unit 503. FIG. 8A illustrates that the data groups S_ch #(h1) (#: 1 to 2) are written to the S data storage units 501 and 503 during the period from time T1w3 to time T1w4.

Next, a description will be given of an operation for reading the signals of the pixels 201 in the first row from the S data storage units 501 and 503 and the N data storage units 502 and 504 in the data processing unit 107.

At time T2, the CPU 101 outputs the horizontal synchronization signal HD to the control unit 102. From time T2r1 to time T2r2, the data group N_ch1(h1) is read from the N data storage unit 502 pixel by pixel. Similarly, the data group N_ch2(h1) is read from the N data storage unit 504 pixel by pixel. The data group S_ch1(h1) is also synchronously read from the S data storage unit 501 pixel by pixel. Similarly, the data group S_ch2(h1) is read from the S data storage unit 503 pixel by pixel. From time T2r1 to time T2r2, the data in the data groups S_ch #(h1) and N_ch #(h1) (#: 1 to 2) is processed by the data calculation unit 505 pixel by pixel, and output from the signal output unit 108.

The operation on the first row has been described above. The second and subsequent rows are successively processed in a similar manner to the first row.

Next, a description will be given of an operation for performing calculation processing on the N data and S data read from the data storage units 501 to 504 by the data calculation unit 505. In the following description, calculation processing on the AD conversion results of the column AD converters 204 in an Mth column and calculation processing on the AD conversion results of the column AD converters 204 in an Lth column will each be described. The column AD converters 204 in the Mth column output signals N1_M_t1, N2_M_t1, S1_M_t1, and S2_M_t1. The column AD converters 204 in the Lth column output signals N1_L_t1, N2_L_t1, S1_L_t1, and S2_L_t1 (L: 1 to m, L≠M).

An operation of the data calculation units 505 in the period from time T2r1 to time T2r2 in FIG. 8B will be described.

[1] Calculation on Mth-Column Data: N1_M_t2, N2_M_t2, S1_M_t2, and S2_M_t2

As described above, the data values of the N data and S data in the Mth column satisfy the relationships of N1_M_t2<N2_M_t2 and S1_M_t2<S2_M_t2. In the example of FIG. 8B, the inputs (thresholds) thresh_S and thresh_N of the data calculation unit 505 satisfy the relationships of N2_M_t2<thresh_N and S2_M_t2<thresh_S. The AD-converted data in the Mth column therefore satisfies the relationships of N2_M_t2<thresh_N and S2_M_t2<thresh_S in magnitude. From Eq. 2, the calculation result of the data calculation unit 505 is thus expressed as the following Eq. 3.

$$SNout=\{(S1\_M\_t2+S2\_M\_t2)-(N1\_M\_t2+N2\_M\_t2)\}/2 \quad \text{(Eq. 3)}$$

[2] Calculation on Lth-Column Data: N1_L_t2, N2_L_t2, S1_L_t2, and S2_L_t2

Like the data in the Mth column, the data values of the N data and S data in the Lth column satisfy the relationships of N1_L_t2<N2_L_t2 and S1_L_t2<S2_L_t2. In the example of FIG. 8B, the input (threshold) thresh_S of the data calculation unit 505 satisfies the relationship of thresh_S<S2_L_t2. That is, the AD-converted data in the Lth column therefore satisfies the relationship of N2_L_t2>thresh_N or S2_L_t2>thresh_S in magnitude. From Eq. 1, the calculation result of the data calculation unit 505 is thus expressed as the following Eq. 4.

$$SNout=S1\_L\_t2-N1\_L\_t2 \quad \text{(Eq. 4)}$$

As described above, in the present exemplary embodiment, two column AD converters 204 are connected to the same vertical signal line 202. The detection unit 611 determines the presence or absence of an error in the plurality of pieces of digital data multi-sampled by the two column AD converters 204. As a result, an imaging apparatus capable of appropriate signal processing can be provided. In the present exemplary embodiment, digital data containing an error is not used for image formation. As a result, the image quality of the imaging apparatus 100 can be improved.

In the example of FIG. 7B according to the present exemplary embodiment, the detection unit 611 performs a determination on only some of the digital signals (N #_M_t1 and S #_M_t1) as determination targets. The detection unit 611 performs no determination on the other digital signals. Such a configuration can provide the effect of reducing circuit scale or reducing power consumption. Moreover, selecting the determination targets based on the operation of the offset addition units 203 can provide an additional effect. Specifically, in the present exemplary embodiment, the detection unit 611 performs the determination on signals to which offsets of relatively large values are added (S2_M_t1>S1_M_t1). The reason is that the purpose of the determination is to detect saturation, and the signal values of the signals to which offsets of large values are added reach a saturation level first. Such a configuration can thus improve the image quality with a small circuit scale or low power consumption. It will be understood that the digital signals to be subjected to the determination change depending on the purpose of the determination. Alternatively, the determination may be performed on all the digital signals.

In the present exemplary embodiment, the determination is described to be performed by comparing the digital signals with the thresholds. However, all the types of determination processing described in the first exemplary embodiment can be applied to the imaging apparatus 100 according to the present exemplary embodiment. As for the configurations for performing such determinations and the effects thereof, the description of the first exemplary embodiment is incorporated.

An imaging apparatus according to a third exemplary embodiment of the present disclosure will be described. The imaging apparatus according to the present exemplary embodiment is a mode of a signal processing apparatus. The first exemplary embodiment has dealt with an example where a vertical signal line 202 is provided for each column and the data processing is performed row by row. By contrast, in the imaging apparatus according to the present exemplary embodiment, a plurality of vertical signal lines 202 is provided for each column of pixels. Specifically, six vertical signal lines 202 are provided for each column. The imaging apparatus according to the present exemplary embodiment has a first mode where AD conversion is simultaneously performed on analog signals (pixel signals) from pixels arranged in six rows, and digital data is sequentially output in units of two pixels in two rows. The imaging apparatus according to the present exemplary embodiment also has a second mode where AD conversion is simultaneously performed on pixel signals from pixels arranged in two rows, and the digital data on the two pixels are sequentially output.

In the second mode of simultaneously performing AD conversion on two columns and outputting digital data, two AD converts are connected to a pixel to perform a plurality of AD conversions (multi-sampling). In other words, four AD converters are used to perform AD conversions in parallel on two pixels in one column and two rows. Since the imaging apparatus according to the present exemplary embodiment has the first mode as well, six AD converters are provided for each column. Unlike the first exemplary embodiment, each vertical signal line 202 is not provided with two column AD converters for the sake of multi-sampling in the second mode of simultaneously performing AD conversions on two rows. By using the column AD converters intended for the first mode of simultaneously performing AD conversions on six rows, appropriate data processing calculations can be performed on multi-sampling data without an additional circuit.

To implement such an operation, the imaging apparatus according to the present exemplary embodiment has a circuit configuration different from that of the first exemplary embodiment in that a plurality of vertical signal lines 202 corresponding to a column is connected to offset addition units 203 and column AD converters 204 via a selection unit 901. Another difference is that a data calculation unit 1003 includes a mechanism (selector 1209) for selecting which signal to output from among those of the plurality of calculation results of the data calculator 610 based on a read mode.

Now, differences from the second exemplary embodiment will mainly be described. Portions a description of which is omitted are all similar to in the second exemplary embodiment. The configuration of the signal processing apparatus 1 according to the first exemplary embodiment is incorporated in its entirety in the present exemplary embodiment.

[Overall Configuration and Pixel Configuration]

A configuration of an imaging apparatus 100 according to the present exemplary embodiment and a configuration of pixels 201 are similar to those of the second exemplary embodiment. In other words, FIG. 2 is a block diagram schematically illustrating the configuration of the imaging apparatus 100 according to the present exemplary embodiment. FIG. 4 is a diagram illustrating an equivalent circuit of a pixel 201 according to the present exemplary embodiment.

Figure 9:
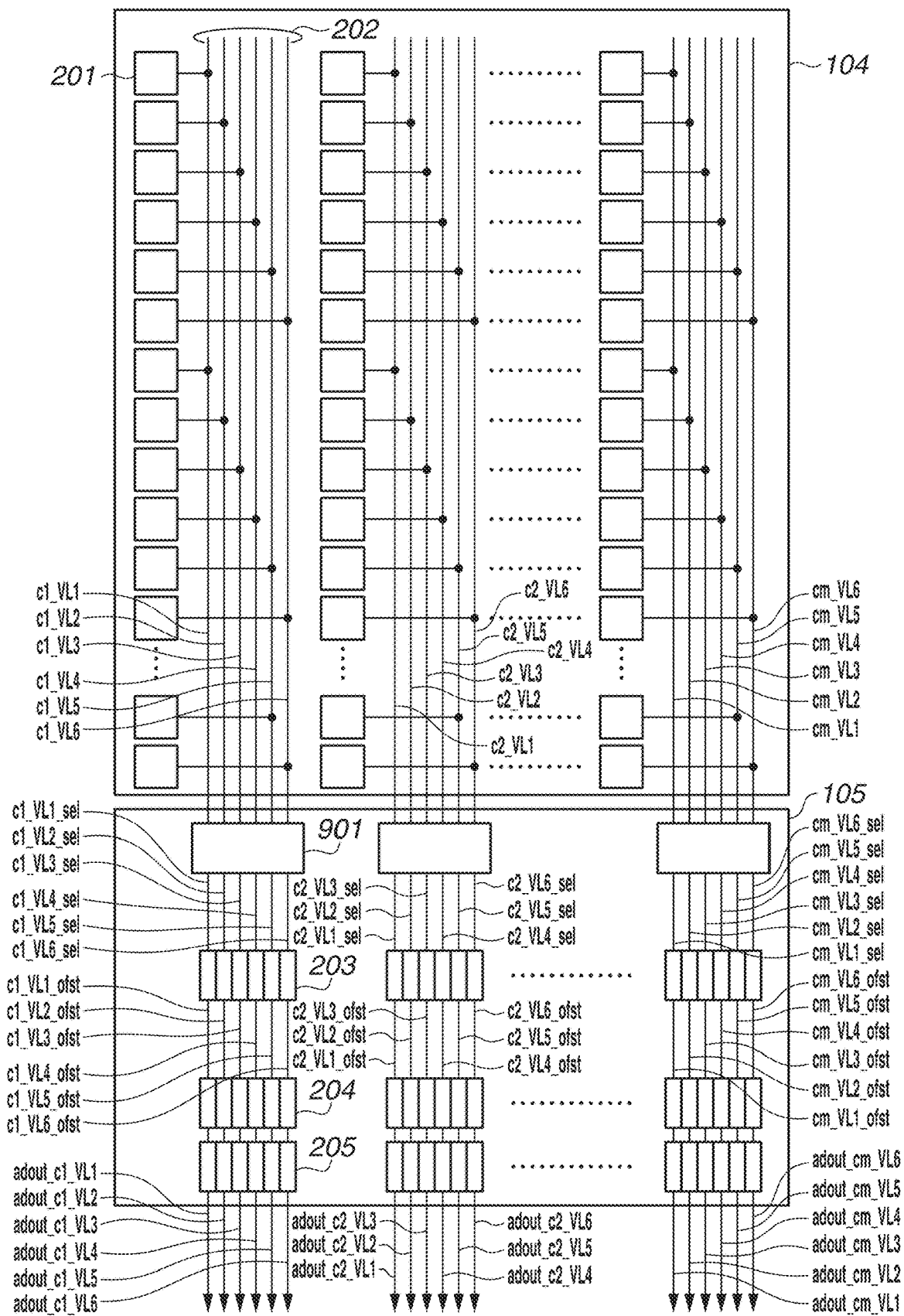
FIG. 9 is a diagram schematically illustrating a configuration of a pixel unit and peripheral circuits in an imaging apparatus.

FIG. 9 is a schematic diagram illustrating a configuration example of a pixel unit 104 and a column AD conversion unit 105 according to the present exemplary embodiment. The pixel unit 104 includes pixels 201 in each column. The pixel unit 104 also includes vertical signal lines 202 connected to the pixels 201 in each column. The vertical signal lines 202 are connected to constant current sources (not illustrated). The vertical signal lines 202 are connected to offset addition units 203. The outputs of the offset addition units 203 are connected to column AD converters 204. The outputs of the column AD converters 204 are connected to holding units 205. In other words, the column AD conversion unit 105 includes a plurality of column AD converters 204. Each column AD converter 204 has a similar function to that of the AD conversion unit 3 described in the first exemplary embodiment. In other words, the description of the AD conversion unit 3 according to the first exemplary embodiment is incorporated in its entirety in the present exemplary embodiment.

In the present exemplary embodiment, six vertical signal lines 202 are provided for each column. Similarly, six offset addition units 203, six column AD converters 204, and six holding unit 205 are provided for each column.

To distinguish the plurality of vertical signal lines 202, in FIG. 9, six vertical signal lines 202 connected to the pixels 201 in the first column are denoted by c1_VL # (#: 1 to 6), and six vertical signal lines 202 connected to the pixels 201 in an mth column are denoted by cm_VL # (#: 1 to 6). The pixel 201 in the first column and the first row is connected to the vertical signal line c1_VL1. The pixel 201 in the first column and the second row is connected to the vertical signal line c1_VL2. In a similar manner, the pixels 201 in the first column are cyclically connected to the corresponding vertical signal lines c1_VL #(#: 1 to 6) in units of six rows.

In the present exemplary embodiment, a plurality of vertical signal lines 202 corresponding to a column are connected to offset addition units 203 and column AD converters 204 via a selection unit 901. The selection unit 901 transmits the signal of a given vertical signal line 202 to one or a plurality of offset addition units 203. For example, the pixel signals output to the vertical signal lines c1_VL # are input to the selection unit 901. The selection unit 901 switches which output signals c1_VL #_sel of the selection unit 901 to connect the six connected vertical lines c1_VL # (#: 1 to 6) to, and output the output signals c1_VL #_sel. The selection unit 901 includes multiplexers and/or switch circuits.

The output signals c1_VL #_sel of the selection unit 901 are input to the offset addition units 203. The offset addition units 203 output offset-added signals c1_VL #_ofst. The offset addition units 203 may include amplification circuits, such as a column amplifier, or attenuator circuits, for example. Alternatively, a configuration capable of adding or subtracting signal values of analog signals can be used.

The output signals c1_VL #_ofst of the offset addition units 203 are input to the column AD converters 204. The column AD converters 204 are blocks for converting analog data into digital data. The column AD converters 204 according to the present exemplary embodiment include a comparator, a ramp wave generator, and a counter each. The ramp wave generator and the counter may be shared by a plurality of column AD converters 204.

The outputs of the column AD converters 204 are connected to the inputs of the holding units 205. The holding units 205 have a similar function to that of the memory unit 7 according to the first exemplary embodiment. The holding units 205 may be omitted. The holding units 205 output signals adout_c1_# (#: 1 to 6). The signals adout_c1_# are digital signals (digital data) and include a plurality of bit signals each.

[Horizontal Transfer Unit]

Figure 10:
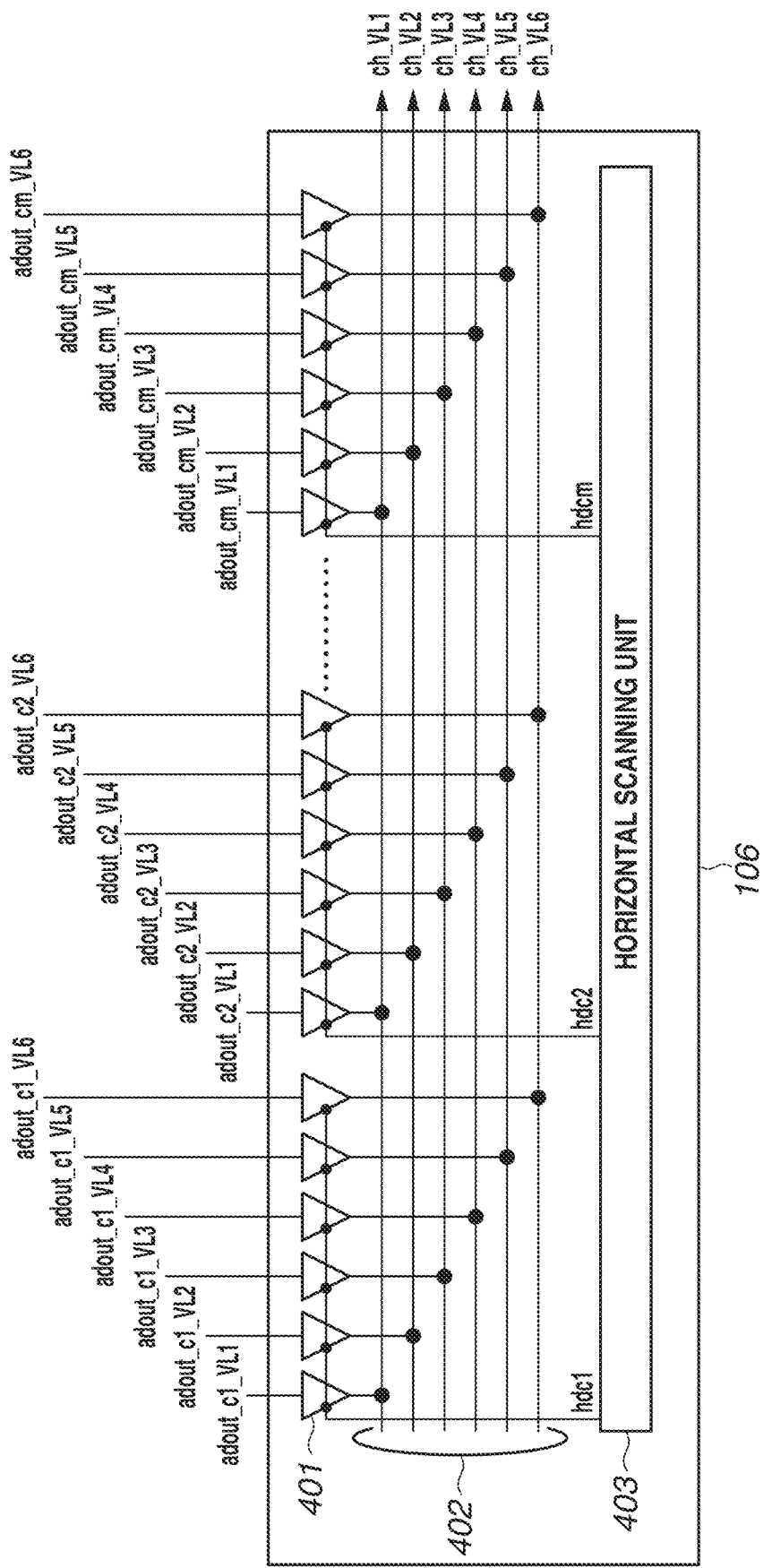
FIG. 10 is a schematic diagram schematically illustrating a configuration of a horizontal transfer unit.

FIG. 10 is a diagram illustrating a configuration example of a horizontal transfer unit 106 according to the present exemplary embodiment. The horizontal transfer unit 106 includes a plurality of three-state buffers 401, horizontal transfer lines 402, and a horizontal scanning unit 403. In the present exemplary embodiment, six channels of horizontal transfer lines 402 are provided for each column.

The outputs adout_cM_VL1 of the column AD conversion unit 105 are output to a horizontal transfer line ch_VL1 via the corresponding three-state butters 401. The outputs adout_cM_VL2 of the column AD conversion unit 105 are output to a horizontal transfer line ch_VL2 via the corresponding three-state buffers 401. The same applies to the subsequent outputs adout_cM_VL3, adout_cM_VL4, adout_cM_VL5, and adout_cM_VL6.

[Data Processing Unit]

Figure 11:
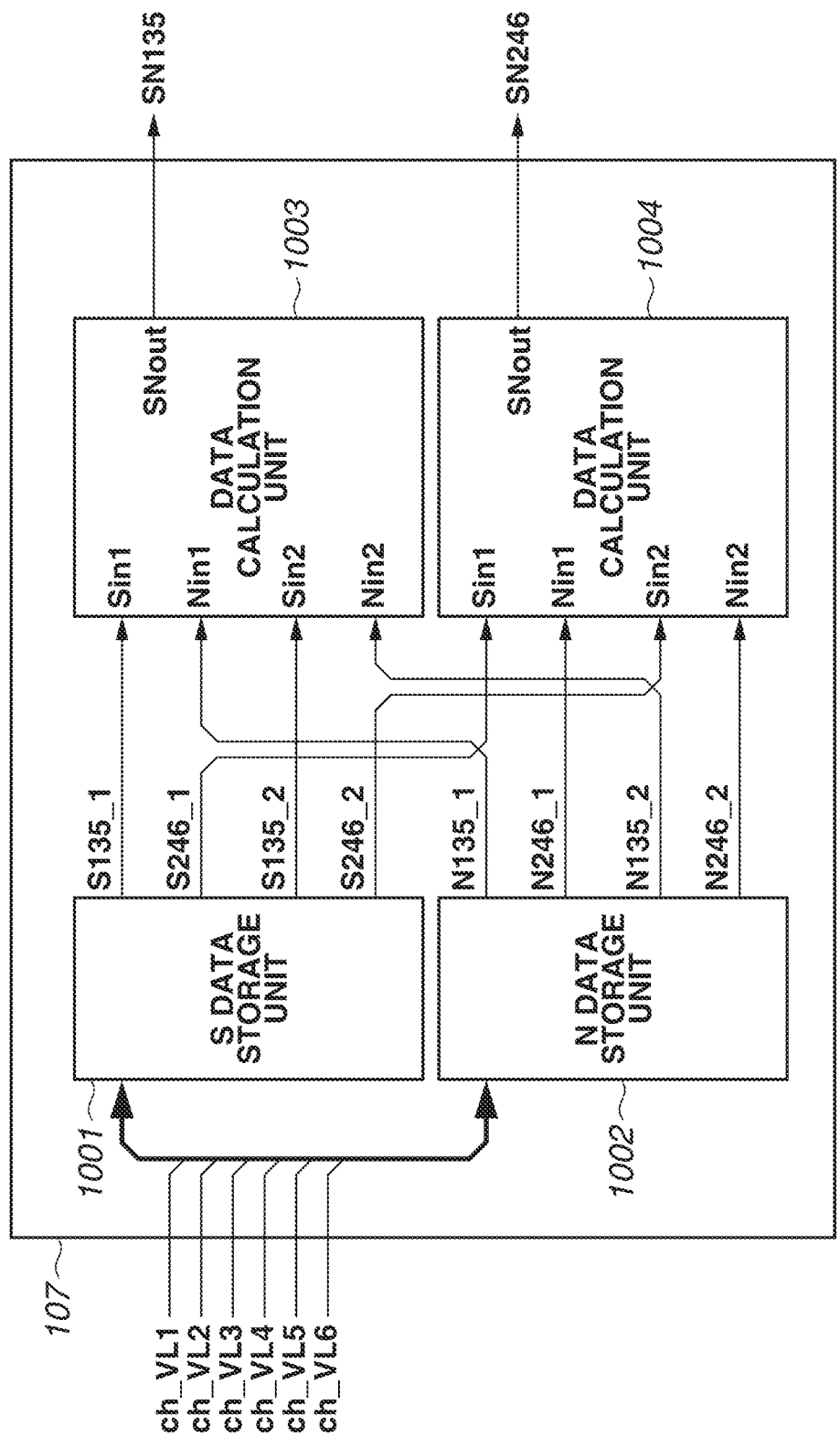
FIG. 11 is a block diagram schematically illustrating a configuration of a data processing unit.

FIG. 11 is a diagram illustrating a configuration example of a data processing unit or circuit 107 according to the present exemplary embodiment. The data processing unit 107 includes an S data storage unit or circuit 1001, an N data storage unit or circuit 1002, and data calculation units or circuits 1003 and 1004. N data and S data are two signals obtained to perform CDS in the imaging apparatus 100. Two pieces of analog data output from a pixel 201 are AD-converted into N data and S data.

The inputs ch_VL # (#: 1 to 6) to the data processing unit 107 are connected to both the S and N data storage units 1001 and 1002. The S data storage unit 1001 includes output ports S135_1, S135_2, S246_1, and S246_2. Both the output ports S135_1 and S135_2 are connected to the data calculation unit 1003. Both the output ports S246_1 and S246_2 are connected to the data calculation unit 1004. The N data storage unit 1002 includes output ports N135_1, N135_2, N246_1, and N246_2. Both the output ports N135_1 and N135_2 are connected to the data calculation unit 1003. Both the output ports N246_1 and N246_2 are connected to the data calculation unit 1004.

The data calculation unit 1003 performs calculation based on its inputs S135_1, S135_2, N135_1, and N135_2. The data calculation unit 1003 outputs the calculation result as an output SN135. The data calculation unit 1004 performs calculation based on its inputs S246_1, S246_2, N246_1, and N246_2. The data calculation unit 1004 outputs the calculation result as an output SN246.

The S and N data storage units 1001 and 1002 can include an SRAM each. Within the acceptable circuit scale, the S and N data storage units 1001 and 1002 may include flip-flops. The S and N data storage units 1001 and 1002 may be other storage elements.

[Storage Units]

The outputs S135_1 and S135_2 of the S data storage unit 1001 and the outputs N135_1 and N135_2 of the N data storage unit 1002 are each generated by selecting any one of the data on the horizontal transfer line ch_VL1, the data on the horizontal transfer line ch_VL3, and the data on the horizontal transfer line ch_VL5 stored in storage units. Similarly, the outputs S246_1 and S246_2 of the S data storage unit 1001 and the outputs N246_1 and N246_2 of the N data storage unit 1002 are each generated by selecting any one of the data on the horizontal transfer line ch_VL2, the data on the horizontal transfer line ch_VL4, and the data on the horizontal transfer line ch_VL6 stored in storage units.

Figure 12:
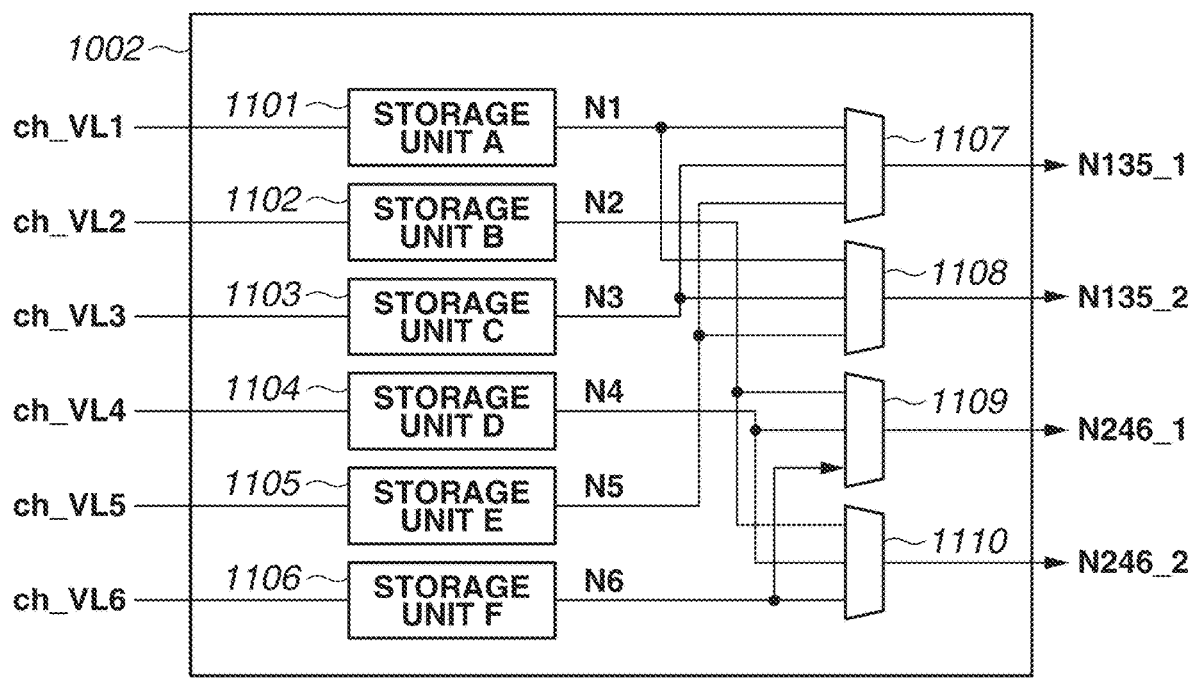
FIG. 12 is a block diagram schematically illustrating a configuration of an N data storage unit.

A description will be given of a configuration example of the S and N data storage units 1001 and 1002 for implementing the foregoing data output. FIG. 12 is a diagram schematically illustrating a configuration of the N data storage unit 1002 illustrated in FIG. 11. The S data storage unit 1001 has a similar configuration to that of the N data storage unit 1002.

The N data storage unit 1002 includes a storage unit A 1101, a storage unit B 1102, a storage unit C 1103, a storage unit D 1104, a storage unit E 1105, a storage unit F 1106, and selectors 1107 to 1110. As described above, the storage unit A 1101 to the storage unit F 1106 may include an SRAM each. The storage unit A 1101 to the storage unit F 1106 may include flip-flops.

The input ch_VL1 to the N data storage unit 1002 is connected to the storage unit A 1101. The input ch_VL2 is connected to the storage unit B 1102. The input ch_VL3 is connected to the storage unit C 1103. The input ch_VL4 is connected to the storage unit D 1104. The input ch_VL5 is connected to the storage unit E 1105. The input ch_VL6 is connected to the storage unit F 1106. The inputs ch_VL1 to ch_VL6 to the N data storage unit 1002 are connected to the storage unit A 1101 to the storage unit F 1106, respectively, and therefore the respective pieces of data are stored.

The selector 1107 selects data from among an output N1 of the storage unit A 1101, an output N3 of the storage unit C 1103, and an output N5 of the storage unit E 1105, and outputs the selected data to the output port N135_1. Similarly, the selector 1108 selects data from among the output N1 of the storage unit A 1101, the output N3 of the storage unit C 1103, and the output N5 of the storage unit E 1105, and outputs the selected data to the output port N135_2. The selector 1109 selects data from among an output N2 of the storage unit B 1102, an output N4 of the storage unit D 1104, and an output N6 of the storage unit F 1106, and outputs the selected data to the output port N246_1. The selector 1110 selects data from among the output N2 of the storage unit B 1102, the output N4 of the storage unit D 1104, and the output N6 of the storage unit F 1106, and outputs the selected data to the output port N246_2.

[Data Calculation Units]

The data calculation units 1003 and 1004 each include a detection unit 611 that detects an anomaly or error in the data values of AD-converted input data Sin1, Sin2, Nin1, and Nin2. The detection unit 611 determines the presence or absence of an error or the probability of occurrence of an error from the values of the input data. In other words, the detection unit 611 is an example of the detection unit 5 according to the first exemplary embodiment. The data calculation units 1003 and 1004 each include a unit (selector 1208 to be described below) that, in a case where an error is detected by the detection unit 611, disables use of the data including the error. The data calculation units 1003 and 1004 therefore provide appropriate data calculation results even in a case where the AD-converted data includes an abnormal value due to reasons such as a surge, for example.

Figure 13A:
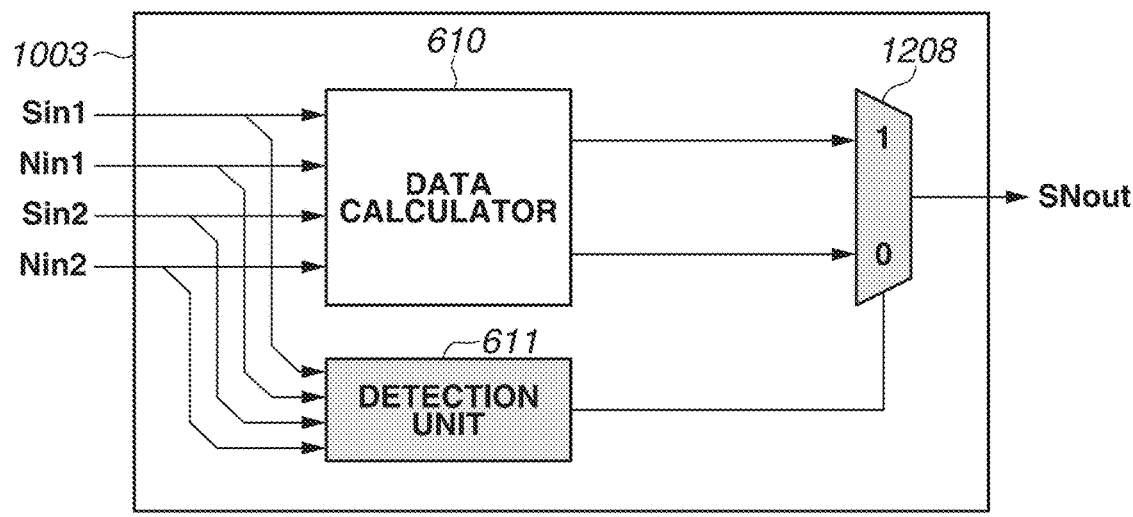
FIGS. 13A and 13B are block diagrams schematically illustrating a configuration of a data calculation unit.

FIG. 13A illustrates a circuit configuration of the data calculation unit 1003. Since the data calculation unit 1004 has a similar configuration to that of the data calculation unit 1003, a redundant description of the data calculation unit 1004 will hereinafter be omitted. The data calculation unit 1003 includes the detection unit 611 that detects an anomaly or error from the data values of the input data Sin1, Sin2, Nin1, and Nin2, and a data calculator 610 that performs various data calculations on the input data Sin1, Sin2, Nin1, and Nin2. The data calculation unit 1003 further includes a selector 1208 that switches between two output results of the data calculator 610 based the determination result of the detection unit 611.

Figure 13B:
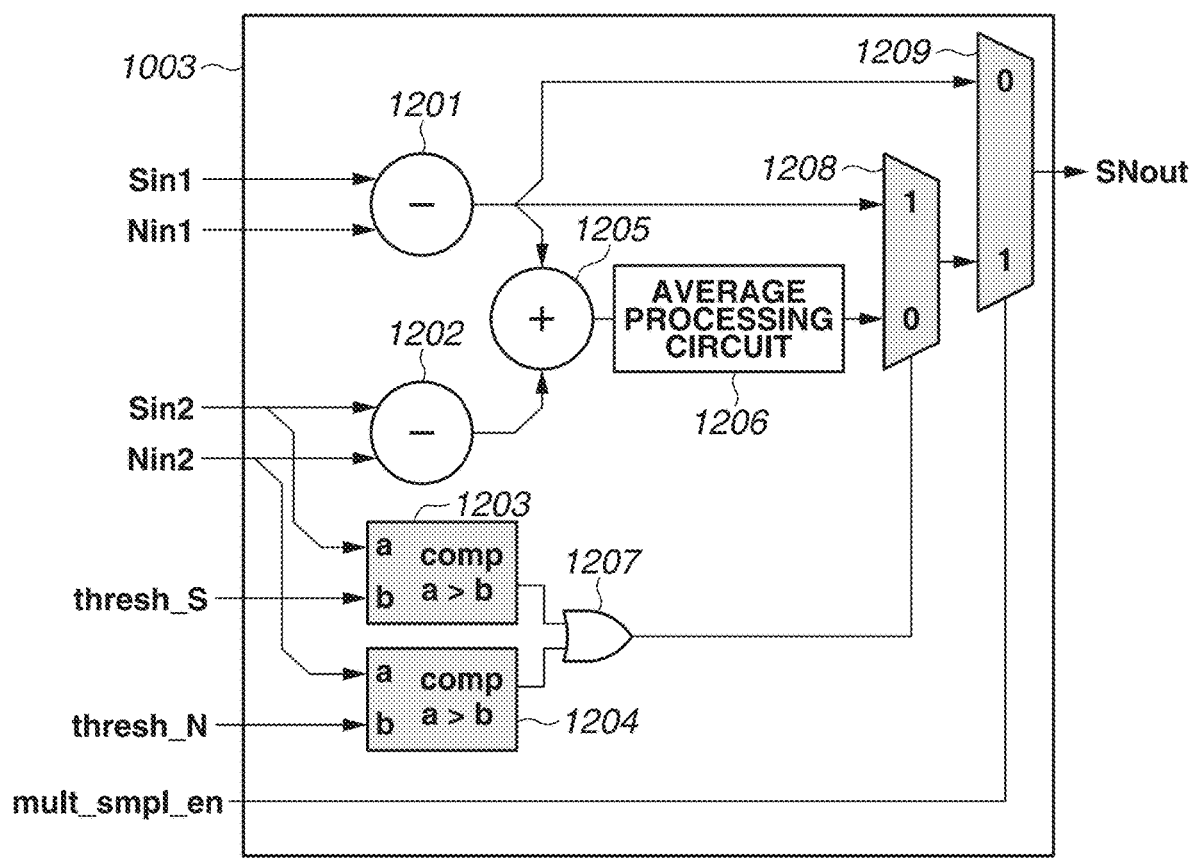

FIG. 13B illustrates an example of processing of the data calculator 610 and the detection unit 611. In the example of FIG. 13B, the data calculator 610 averages the S data and the N data. The detection unit 611 performs a determination by comparing the input data Sin2 and Nin2 with thresholds.

The data calculation unit 1003 initially obtains a difference between the input data Sin1 and the input data Nin, or Sin1−Nin1. The data calculation unit 1003 simply outputs the difference between the input data Sin 1 and the input data Nin1 in any of the following cases 1 to 3: Case 1 is where the input data Sin2 is greater than a threshold thresh_S. Case 2 is where the input data Nin2 is greater than a threshold thresh_N. Case 3 is where a signal mult_smpl_en indicates a state where multi-sampling is not performed. In the present exemplary embodiment, multi-sampling is not performed in a case where the signal mult_smpl_en is "0". In such cases 1 to 3, the output SNout is expressed by the following Eq. 5.

$$SNout = Sin1 - Nin1 \quad (Eq. 5)$$

The data calculation unit 1003 also obtains a difference between the input data Sin2 and the input data Nin2, or Sin2−Nin2. The data calculation unit 1003 outputs an average of (Sin1−Nin1) and (Sin2−Nin2) in a case where all of the following conditions 1 to 3 are satisfied. Condition 1 is that the input data Sin2 is less than or equal to the threshold thresh_S. Condition 2 is that the input data Nin2 is less than or equal to the threshold thresh_N. Condition 3 is that the signal mult_smpl_en indicates a state where multi-sampling is performed. In the present exemplary embodiment, multi-sampling is performed in a case where the signal mult_smpl_en is "1". In such a case, the output SNout is expressed by the following Eq. 6.

$$SNout = \{(Sin1 - Nin1) + (Sin2 - Nin2)\}/2 \quad (Eq. 6)$$

A difference from the second exemplary embodiment is the addition of a selector 1209 for switching the value of the output SNout depending on the signal mult_smpl_en. The selector 1209 inputs the output of a subtractor 1201 and the output of the selector 1208, and switches the value to be output based on the value of the signal mult_smpl_en. With such a mechanism, whether the value of the output SNout depends on the operation of detection unit 611 can be switched by setting the value of the signal mult_smpl_en based on the read mode.

In other respects, the configuration of the data calculation unit 1003 is similar to that of the data calculation unit 505 according to the first exemplary embodiment. Specifically, the subtractor 1201, a subtractor 1202, an adder 1205, and an average processing circuit 1206 are similar to the subtractor 601, the subtractor 602, the adder 605, and the average processing circuit 606, respectively. A comparator 1203, a comparator 1204, an OR circuit 1207, and the selector 1208 are similar to the comparator 603, the comparator 604, the OR circuit 607, and the selector 608, respectively. The description of the first exemplary embodiment is incorporated here, and a redundant description will be omitted.

As described above, in the present exemplary embodiment, the detection unit 611 including the comparator 1203 serves as a detection unit. The selector 1208 switches the data to be output based on the output of the detection unit 611. The method of signal processing is thus changed based on the result output from the detection unit 611. As a modification, the selector 1208 may be omitted, and the presence or absence of an error may be separately output to outside.

[Driving Method]

Figure 14A:
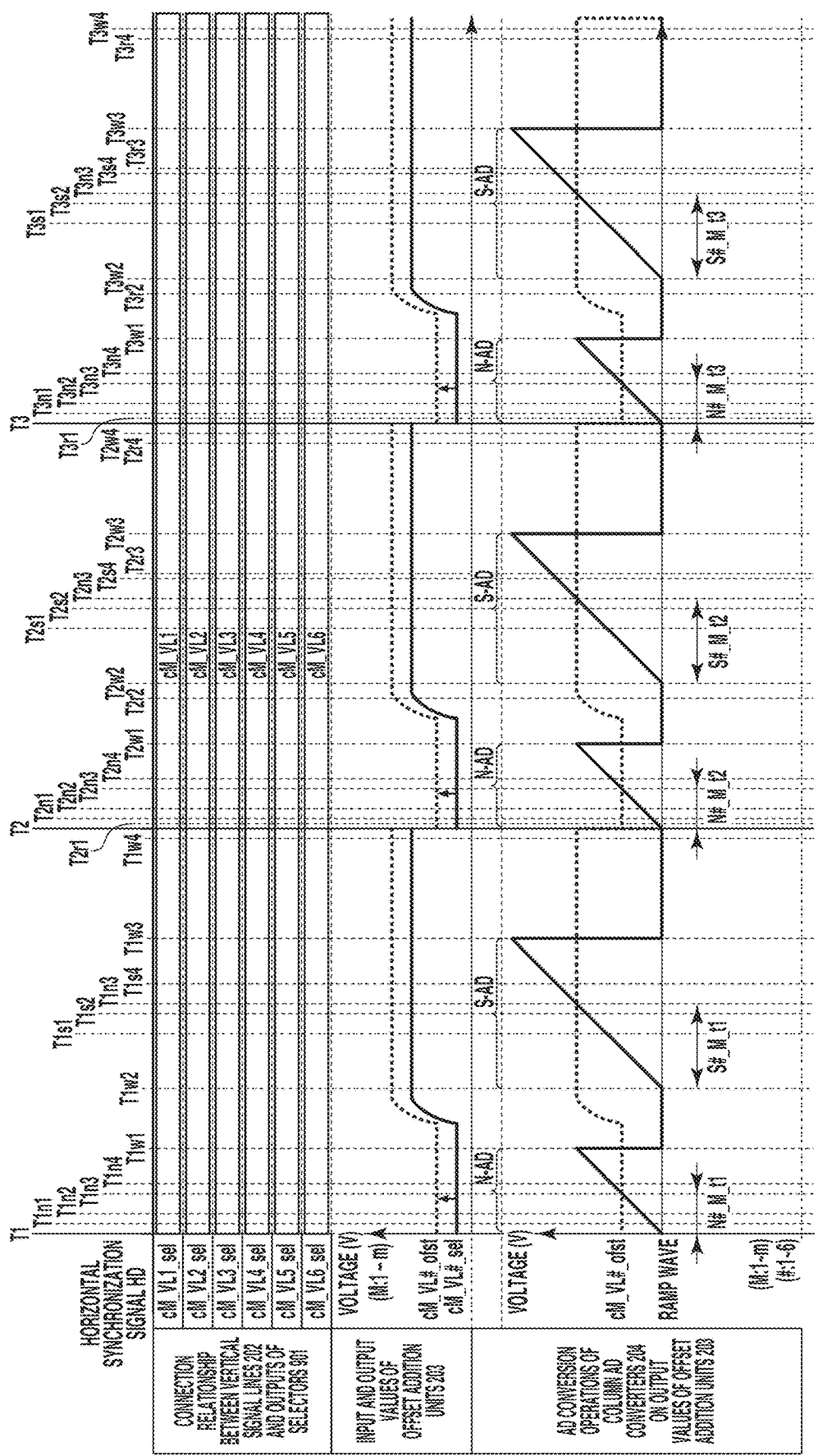
Figure 14B:
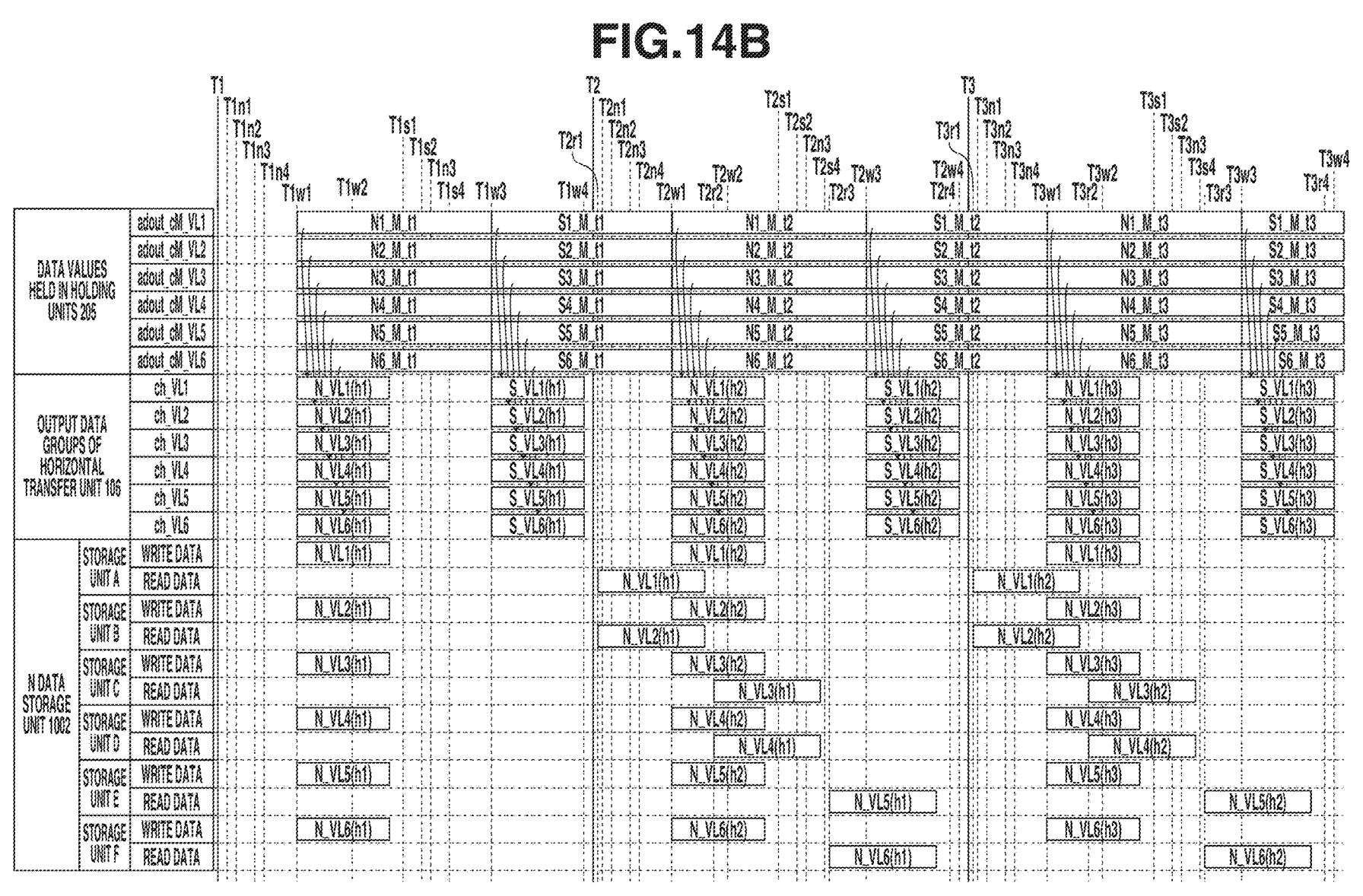
Figure 14C:
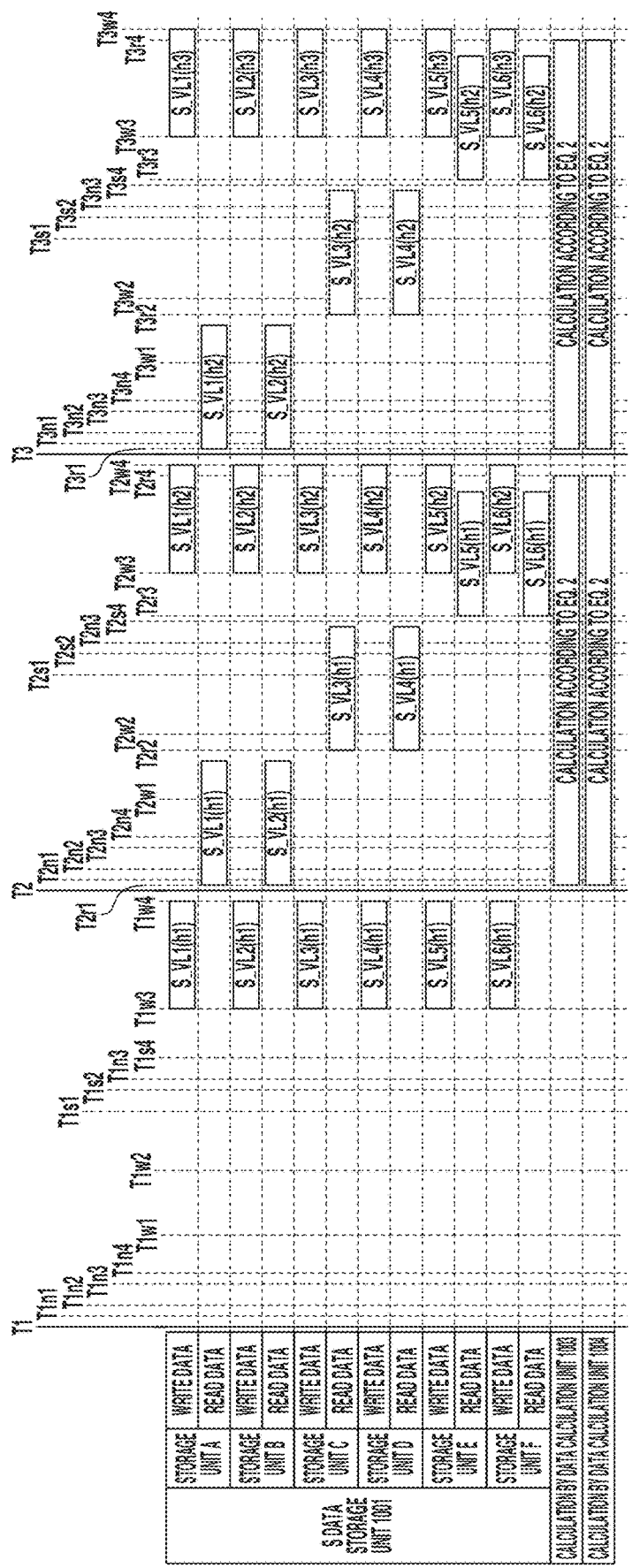
Figure 15A:
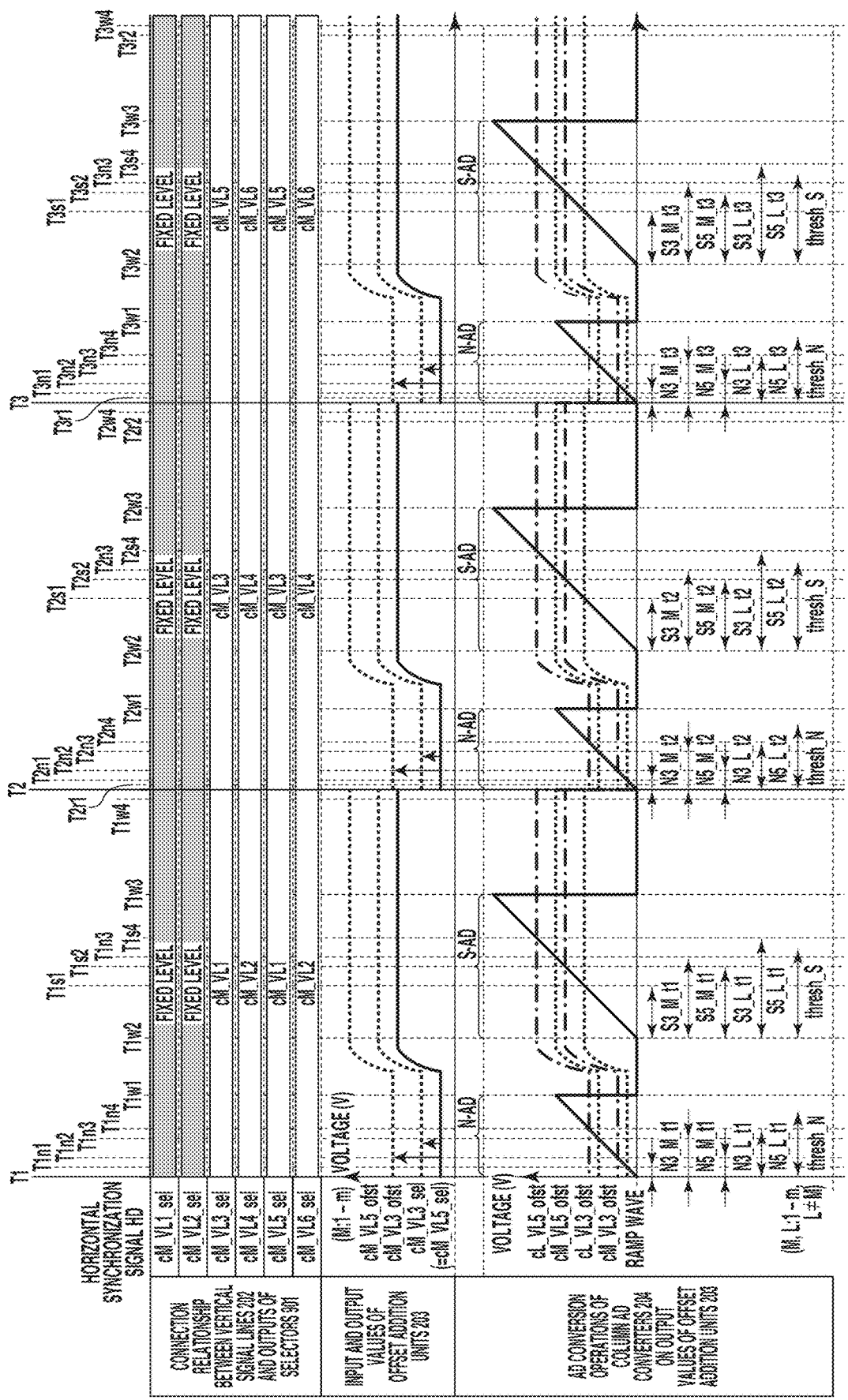
Figure 15B:
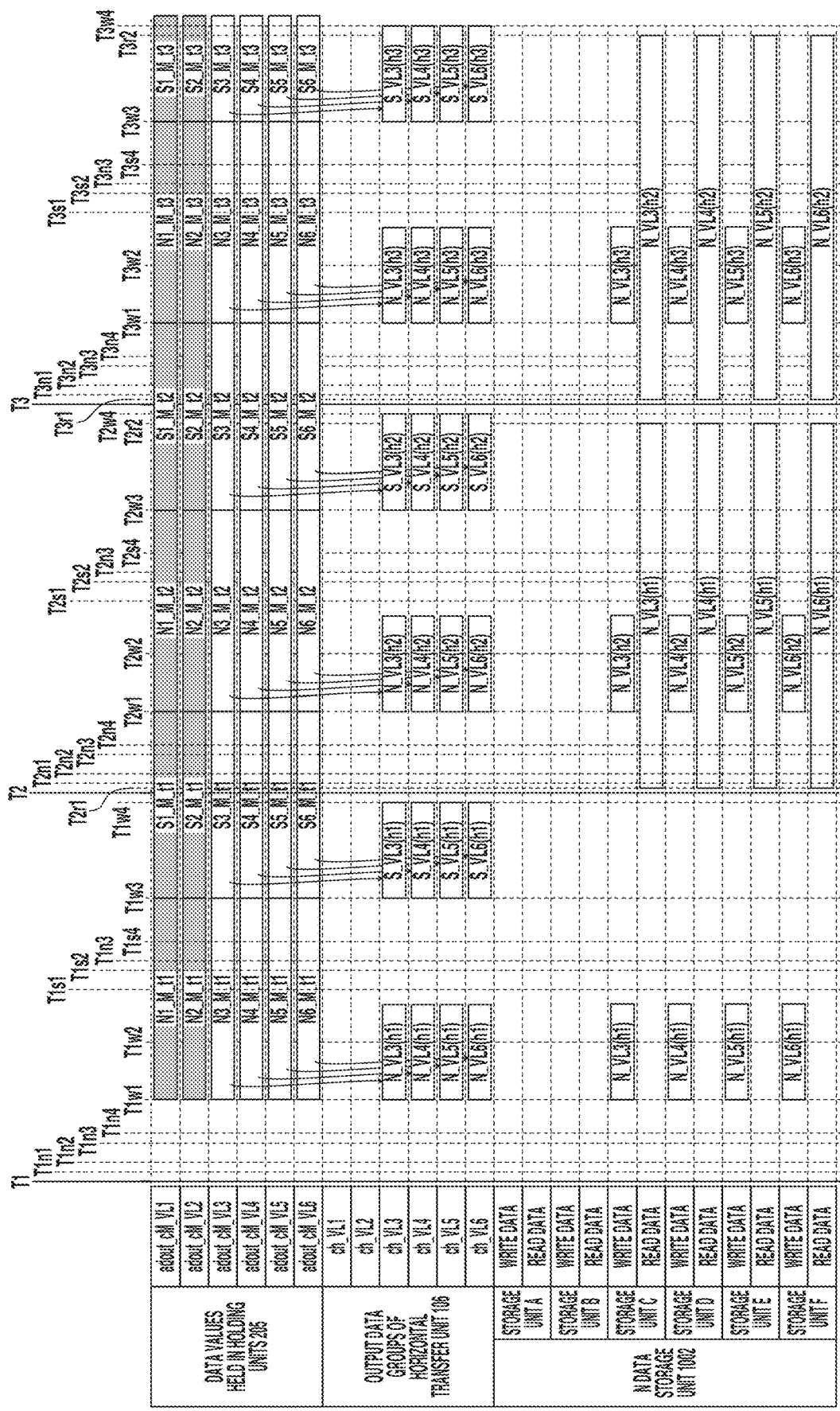

Next, a driving method of the imaging apparatus 100 according to the present exemplary embodiment will be described. FIGS. 14A to 14C and 15A to 15C are timing charts illustrating examples of operation of the column AD conversion unit 105, the horizontal transfer unit 106, and the data processing unit 107. The imaging apparatus 100 according to the present exemplary embodiment has the first mode (FIGS. 14A to 14C) and the second mode (FIG. 15). In the first mode, the imaging apparatus 100 performs AD conversions on signals from pixels 201 in six rows in parallel. The imaging apparatus 100 then sequentially outputs data in units of two pixels in two rows. In the second mode, the imaging apparatus 100 performs AD conversions on signals from pixels 201 in two rows in parallel. The imaging apparatus 100 then sequentially outputs the signals from the pixels 201 in the two rows column by column. In the second mode of simultaneously performing AD conversion on two columns and outputting digital data, two column AD converters 203 are connected to a pixel 201 (vertical signal line 202) in parallel and operated to perform a plurality of AD conversions on one signal in parallel. To read the signals from pixels 201 in two rows in parallel, two vertical signal lines 202 and a total of four column AD converters 203 are used.

[Driving Method in First Mode]

Operations in the first mode will be described with reference to FIGS. 14A to 14C. As an overall procedure, (1) an operation for obtaining digital data and storing the digital data in a memory (S and N data storage units 1001 and 1002), (2) an operation for reading the digital data from the memory, and (3) a calculation operation on the data read from the memory will be described in order.

For data writing, AD conversion is initially performed on the output signals of pixels 201 in the first to sixth rows. The obtained digital data is written to the storage unit A 1101, the storage unit B 1102, the storage unit C 1103, the storage unit D 1104, the storage unit E 1105, and the storage unit F 1106 of the data processing unit 107.

At time T1, the CPU 101 outputs the horizontal synchronization signal HD to the control unit 102. Receiving the horizontal synchronization signal HD, the control unit 102 controls the vertical scanning unit 103. By the control, the pixel unit 104 outputs N signals (noise signals) to vertical signal lines cM_VL #(M: 1 to m) (#: 1 to 6) in all the columns at the same time. The N signals are signals obtained by cancelling the resetting of the floating diffusion portions FD and then reading the charges in the floating diffusion portions FD via the signal amplification units 314. In other words, the N signals can contain noise components occurring when the floating diffusion portions FD are reset.

The selection units 901 select which of the outputs cM_VL #_sel (M: 1 to m) (#: 1 to 6) of the selection units 901 to connect each of the vertical signal lines cM_VL # to. In the first mode (real read mode), the vertical signal lines cM_VL1 to cM_VL6 are connected to the outputs cM_VL1_sel to cM_VL6_sel, respectively. For example, the vertical signal line c1_VL1 is connected to the output c1_VL1_sel, and the vertical signal line c1_VL2 is connected to the c1_VL2_sel. The same applies to the vertical signal lines c1_VL3 to c1_VL6 and the outputs c1_VL3_sel to c1_VL6_sel. As for the vertical signal lines 202 in the second column, the vertical signal line c2_VL1 is connected to the output c2_VL1_sel, and the vertical signal lines c2_VL2 is connected to the output c2_VL2_sel. The same applies to the rest.

The offset addition units 203 simultaneously add offsets to the signals of the outputs cM_VL #_sel of the selection units 901. The values of the offsets to be added are the same in all the columns. However, the values of the offsets to the six outputs cM_VL #_sel (#: 1 to 6) in a column may be different from one another. Offsets having such six different values can be applied to each column. Alternatively, the same value may be used for six outputs cM_VL #_sel (#: 1 to 6) in a column, while the offset value in the first column may be different from that in the second column.

From time T1 to time T1w1, the column AD converters 204 perform AD conversion on the output cM_VL #_ofst (M: 1 to m) (#: 1 to 6) of the offset addition units 203 in all the columns at the same time. The operation during the AD conversion is the same as in the second exemplary embodiment. The digital data converted from the signals cM_VL #_ofst (M: 1 to m) (#: 1 to 6) output from the offset addition units 203 here is output from the column AD converters 204 as data N #_M_t1 (M: 1 to m) (#: 1 to 6).

At time T1w1, all the data is simultaneously transferred to the holding units 205. The data groups generated here, i.e. the data groups obtained by AD-converting the signals cM_VL #_ofst will be denoted by N_VL #(h1). The numeral in "h1" indicates the group of a plurality of rows to be read in parallel. For example, h1 represents the first six rows to be read. h2 represents the next six rows to be read after h1. The same applies to h3 and the rest.

From time T1w1 to time T1w2, the data groups N_VL #(h1) (#: 1 to 6) in the holding units 205 are transferred to the data processing unit 107 via the horizontal transfer unit 106 pixel by pixel. The data groups N_VL #(h1) are sequentially written to the N data storage unit 1002. FIGS. 14A to 14C illustrate that the data groups N_VL #(h1) (#: 1 to 6) are written to the N data storage unit 1002 during the period from time T1w1 to time T1w2. When written, the data groups N_VL1(h1) to N_VL6(h1) are stored into the storage unit A 1101 to the storage unit F 1106 of the N data storage unit 1002, respectively.

Next, at time T1w2, like when the N signals are output, the pixels 201 in the six rows output S signals to the vertical signal lines cM_VL # (M: 1 to m) (#: 1 to 6) in all the columns at the same time. The S signals are signals obtained by transferring the charges in the photoelectric conversion elements (PD) 311 to the floating diffusion portions FD by the charge transfer units 312, and reading the charges in the floating diffusion portions FD at that time via the signal amplification units 314.

The selection units 901 select which of the outputs cM_VL #_sel (M: 1 to m) (#: 1 to 6) of the selection units 901 to connect each of the vertical signal lines cM_VL # to. The selection units 901 basically select the same connection relationship as when the N signals are read. Specifically, the vertical signal lines cM_VL1 to cM_VL6 are connected to the outputs cM_VL1_sel to cM_VL6_sel, respectively.

The offset addition units 203 simultaneously add offsets to the signals of the outputs cM_VL #_sel of the selection units 901. The values of the offsets to be added are the same as those of the offsets added to the N signals. That is, the values of the offsets to be added may be the same in all the columns, may differ within each column, or may differ from one column to another.

From time T1w2 to T1w3, the column AD converters 204 perform AD conversion on the outputs cM_VL #_ofst (M: 1 to m) (#: 1 to 6) of the offset addition units 203 in all the columns at the same time. The operation during the AD conversion is the same as in the second exemplary embodiment. The digital data converted from the signals cM_VL #_ofst (M: 1 to m) (#: 1 to 6) output from the offset addition units 203 here is output from the column AD converters 204 as data S #_M_t1 (M: 1 to m) (#: 1 to 6).

At time T1w3, all the data is simultaneously transferred to the holding units 205. The data groups generated here, i.e. the data groups obtained by AD-converting the signals cM_VL #_ofst will be denoted by S_VL #(h1). The meanings of "h1" and "h2" are the same as with N_VL #(h1) and the like.

From time T1w3 to time T1w4, the data groups S_VL #(h1) (#: 1 to 6) in the holding units 205 are transferred to the data processing unit 107 via the horizontal transfer unit 106 pixel by pixel. The data groups S_VL #(h1) are sequentially written to the S data storage unit 1001. FIGS. 14A to 14C illustrate that the data groups S_VL #(h1) (#: 1 to 6) are written to the S data storage unit 1001 during the period from time T1w3 to time T1w4. When written, the data groups S_VL1(h1) to S_VL6(h1) are stored into the storage unit A 1101 to the storage unit F 1106 of the S data storage unit 1001, respectively. As described above, the S data storage unit 1001 has a similar configuration to that of the N data storage unit 1002.

Next, an operation for reading the signals of the pixels 201 in the first to sixth rows from the S and N data storage units 1001 and 1002 of the data processing unit 107 will be described. Digital data written in an HD period is read in the next HD period.

At time T2, the CPU 101 outputs the horizontal synchronization signal HD to the control unit 102. From time T2r1 to time T2r2, the data group N_VL1(h1) in the first row and the data group N_VL2(h1) in the second row are read from the N data storage unit 1002 pixel by pixel. The data group S_VL1(h1) in the first row and the data group S_VL2(h1) in the second row are also synchronously read from the S data storage unit 1001 pixel by pixel. From time T2r1 to time T2r2, the data calculation unit 1003 performs data processing on the data groups S_VL1(h1) and N_VL1(h1) pixel by pixel. The data calculation unit 1004 performs data processing on the data groups S_VL2(h1) and N_VL2(h1) pixel by pixel. The processing results are output from the signal output unit 108.

Similarly, from time T2r2 to time T2r3, the data in the third and fourth rows is data-processed in units of two pixels in one column and two rows. The processing results are output from the signal output unit 108. Similarly, from time T2r3 to time T2r4, the data in the fifth and sixth rows is data-processed in units of two pixels in one column and two rows. The processing results are output from the signal output unit 108.

As described above, the data in the first to sixth rows is initially obtained by AD conversions simultaneously performed on the pixel signals from the plurality of pixels 201 arranged in the six rows. Then, the data in the first and second, two rows is initially sequentially output from the imaging apparatus 100 column by column. All the data on the pixels 201 in the third and fourth rows is similarly read out. Finally, the data on the pixels 201 in the fifth and sixth rows is read out.

Next, an operation of the data calculation units 1003 and 1004 will be described. The data calculation units 1003 and 1004 perform signal processing on the data read from the data storage units (S and N data storage units 1001 and 1002).

In the real read mode, the signal mult_smpl_en of the circuit illustrated in FIG. 13B is low. In other words, the signal mult_smpl_en indicates the state where multi-sampling is not performed. The data calculation units 1003 and 1004 thus output a difference between the inputs Sin1 and Nin1 each. Specifically, based on Eq. 5, the result (output SN135) of the signal processing by the data calculation unit 1003 and the result (output SN246) of the signal processing by the data calculation unit 1004 are expressed by the following Eqs. 7 and 8, respectively:

$$SN135 = S\#\_M\_t1 - N\#\_M\_t1 (\#: 1, 3, \text{ or } 5) \quad \text{(Eq. 7), and}$$

$$SN246 = S\#\_M\_t1 - N\#\_M\_t1 (\#: 2, 4, \text{ or } 6) \quad \text{(Eq. 8).}$$

[Driving Method in Second Mode]

The second mode will be described with reference to FIG. 15. In the second mode, AD conversion is simultaneously performed on signals from pixels 201 arranged in two rows. Signal processing is then performed on the obtained digital data, and the processing results are sequentially output in units of two pixels in one column and two rows. The selection units 901 selects two of six vertical signal lines 202 in the respective columns each time when the horizontal synchronization signal HD is output, and connect the selected vertical signal lines 202 to the subsequent circuits. The selection units 901 switch the two vertical signal lines 202 to be selected while write and read operations are performed in units of two rows. Such operations are repeated in cycles of three HD periods to read the signals from all the pixels 201. As an overall procedure in each HD period, (1) an operation for obtaining digital data and storing the digital data in a memory (S and N data storage units 1001 and 1002), (2) an operation for reading the digital data from the memory, and (3) a calculation operation on the data read from the memory will be described in order.

A write operation will initially be described. the operation in this mode uses four storage units (for example, the storage unit C 1103, the storage unit D 1104, the storage E 1105, and the storage unit F 1106) in each of the S and N data storage units 1001 and 1002. Meanwhile, the other two storage units (storage unit A 1101 and storage unit B 1102) are not used.

Initially, AD conversion is performed on the output signals of the pixels 201 in the first and second rows. The obtained digital data is written to the storage unit C 1103, the storage unit D 1104, the storage unit E 1105, and storage unit F 1106 of the data processing unit 107.

At time T1, the CPU 101 outputs the horizontal synchronization signal HD to the control unit 102. Receiving the horizontal synchronization signal HD, the control unit 102 controls the vertical scanning unit 103. By the control, the pixel unit 104 outputs N (noise) signals to the vertical signal lines cM_VL # (M: 1 to m) (#: 1 to 2) in all the columns at the same time. The N signals are signals obtained by cancelling the resetting of the floating diffusion portions FD and then reading the charges in the floating diffusion portions FD via the signal amplification units 314.

The selection units 901 select which of the outputs cM_VL #_sel (M: 1 to m) (#: 1 to 6) of the selection units 901 to connect each of the vertical signal lines cM_VL # to. In the second mode, from time T1 to time T2, the vertical signal lines cM_VL1 are connected to both the outputs cM_VL3_sel and cM_VL5_sel of the selection units 901. Similarly, from time T1 to time T2, the vertical signal lines cM_VL2 are connected to both the outputs cM_VL4_sel and cM_VL6_sel of the selection units 901.

Similarly, from time T2 to T3, the signals of the vertical signal lines cM_VL3 are output to both the outputs cM_VL3_sel and cM_VL5_sel. The signals of the vertical signal lines cM_VL4 are output to both the outputs cM_VL4_sel and cM_VL6_sel. Similarly, from time T3 to T3w4, the vertical signal lines cM_VL5 are connected to both the outputs cM_VL3_sel and cM_VL5_sel. In the same period, the signals of the vertical signal lines cM_VL6 are output to both the outputs cM_VL4_sel and cM_VL6_sel. The selection units 901 are subsequently controlled, and therefore the vertical signal lines 202 to be connected are switched in a similar manner to the foregoing in units of three HD periods.

By such selection operations of the selection units 901, a plurality of AD conversions can be performed on an analog signal (pixel signal). While a description is given of an example where a vertical signal line 202 is connected to two outputs, a vertical signal line 202 may be connected to three outputs. In such a case, all the six memories in each data storage unit are used. In a case where, like the present exemplary embodiment, some of the outputs of the selection units 901 are not used, the signal levels of the unused output nodes (outputs cM_VL1_sel and cM_VL2_sel) may be fixed.

The offset addition units 203 add offsets to the outputs cM_VL #_sel of the selection units 901. At least two offset units 203 connected to a selection unit 901 add offsets of respective different values. In the example illustrated in FIGS. 15A to 15C, the signals cM_VL3 and cM_VL5 have the same signal values. By contrast, the signal cM_VL5_ofst obtained by adding an offset to the signal cM_VL5 has a signal value greater than that of the signal cM_VL3_ofst obtained by adding an offset to the signal cM_VL3. In other words, the offset values are set in such a manner that the relationship of cM_VL3_ofst<cM_VL5_ofst is satisfied. Similarly, the offset addition units 203 add offsets in such a manner that cM_VL4_ofst<cM_VL6_ofst. The following description deals with the signals cM_VL3_ofst and cM_VL5_ofst. A similar description applies to the processing of the signals cM_VL4_ofst and cM_VL6_ofst.

By the selection operation of the selection units 901 and the addition of offsets by the offset addition units 203, each N signal is split into two signals having different offset values. However, the added offsets are eventually removed. Like the example described with reference to FIG. 1C of the first exemplary embodiment, the imaging apparatus 100 according to the present exemplary embodiment thus performs a plurality of AD conversions on an analog signal (N signal from a pixel). In other words, the imaging apparatus 100 according to the present exemplary embodiment includes the configuration illustrated in FIG. 1C, where processing circuits for performing respective different processes are inserted between the input node IN and the respective AD conversion units 3a and 3b.

From time T1 to time T1w1, the column AD converters 204 perform AD conversion on the outputs cM_VL #_ofst (M: 1 to m) (#: 3 to 6) of the offset addition units 203 in all the columns at the same time. The operation during the AD conversion is similar to that in the first mode or in the second exemplary embodiment. The digital data converted from the signals cM_VL #_ofst (M: 1 to m) (#: 3 to 6) output from the offset addition units 203 here is output from the column AD converters 204 as data N #_M_t1 (M: 1 to m) (#: 3 to 6).

At time T1w1, all the data is simultaneously transferred to the holding units 205. The data groups generated here, i.e. the data groups obtained by AD-converting the signals cM_VL #_ofst will be denoted by N_VL #(h1). Since the data groups N_VL #(h1) (#: 1 to 2) are not used, the data groups N_VL #(h1) (#: 1 to 2) do not need to be transferred. As described in the first mode, the numeral in "h1" indicates the group of a plurality of rows to be read in parallel. For example, h1 represents the first two rows to be read. h2 represents the next two rows to be read after h1. The same applies to h3 and the rest.

From time T1w1 to time T1w2, the data groups N_VL #(h1) (#: 3 to 6) in the holding units 205 are transferred to the data processing unit 107 via the horizontal transfer unit 106. The data groups N_VL #(h1) (#: 3 to 6) are sequentially written to the N data storage unit 1002. FIGS. 15A to 15C illustrate that the data groups N_VL #(h1) (#: 3 to 6) are written to the N data storage unit 1002 during the period from time T1w1 to time T1w2. When written, the data groups N_VL3(h1) to N_VL6(h1) are stored into the storage unit C 1103 to the storage unit F 1106 of the N data storage unit 1002, respectively.

Next, at time T1w2, like when outputting the N signals, the pixels 201 in two rows output S signals to the vertical signal lines cM_VL # (M: 1 to m) (#: 1 to 2) in all the columns at the same time. The S signals are signals obtained by transferring the charges in the photoelectric conversion elements (PDs) 311 to the floating diffusion portions FD by the charge transfer units 312 and reading the charges in the floating diffusion portions FD at that time via the signal amplification units 314.

The selection units 901 select which of the outputs cM_VL #_sel (M: 1 to m) (#: 1 to 6) of the selection units 901 to connect each of the vertical signal lines cM_VL # to. The selection units 901 basically select the same connection relationship as when reading the N signals. Specifically, from time T1 to time T2, the signals of the vertical signal lines cM_VL1 are output as the signals cM_VL3_sel and cM_VL5_sel. The signals of the vertical signal lines cM_VL2 are output as the signals cM_VL4_sel and cM_VL6_sel.

In the second mode, the outputs cM_VL1_sel and cM_VL2_sel are not used. The signal levels of the outputs cM_VL1_sel and cM_VL2_sel may therefore be desirably fixed.

The offset addition units 203 simultaneously add offsets to the signals of the outputs cM_VL #_sel of the selection units 901. The values of the offsets to be added are the same as those of the offsets added to the N signals. By adding the offsets, cM_VL3_ofst<cM_VL5_ofst and cM_VL4_ofst<cM_VL6_ofst are satisfied.

A description will be given of the signals cM_VL3_ofst and cM_VL5_ofst. A similar description applies to the processing of the signals cM_VL4_ofst and cM_VL6_ofst.

By the selection operation of the selection units 901 and the addition of the offsets by the offset addition units 203, each S signal is split into two signals having different offset values. However, the added offsets are eventually removed. Like the example described with reference to FIG. 1C of the first exemplary embodiment, the imaging apparatus 100 according to the present exemplary embodiment can thus perform a plurality of AD conversions on an analog signal (S signal from a pixel).

From time T1w2 to time T1w3, the column AD converters 204 perform AD conversion on the outputs cM_VL #_ofst (M: 1 to m) (#: 3 to 6) of the offset addition units 203 in all the columns at the same time. The operation during the AD conversion is similar to that in the first mode or in the second exemplary embodiment. The digital data converted from the signals cM_VL #_ofst (M: 1 to m) (#: 3 to 6) output from the offset addition units 203 here is output from the column AD converters 204 as data S #_M_t1 (M: 1 to m) (#: 3 to 6).

At time T1w3, all the data is simultaneously transferred to the holding units 205. The data groups generated here, i.e. the data groups obtained by AD-converting the signals cM_VL #_ofst will be denoted by S_VL #(h1). Since the data groups S_VL #(h1) (#: 1 to 2) are not used, the data groups S_VL #(h1) (#: 1 to 2) do not need to be transferred.

From time T1w3 to time T1w4, the data groups S_VL #(h1) (#: 3 to 6) in the holding units 205 are transferred to the data processing unit 107 via the horizontal transfer unit 106. The data groups S_VL #(h1) (#: 3 to 6) are sequentially written to the S data storage unit 1001. FIGS. 15A to 15C illustrates that the data groups S_VL #(h1) (#: 3 to 6) are written to the S data storage unit 1001 during the period from time T1w3 to T1w4. When written, the data groups S_VL3(h1) to S_VL6(h1) are stored into the storage unit C 1103 to the storage unit F 1106 of the S data storage unit 1001, respectively.

As described above, the data groups S_VL #(h1) (#: 3 to 6) and the data groups N_VL #(h1) (#: 3 to 6) obtained from the pixels 201 in the first and second rows are written to the S and N data storage units 1001 and 1002 in one HD period. Subsequently, the selection units 901 switch the vertical signal lines to be selected in each HD period. The data groups S_VL #(h2) (#: 3 to 6) and the data groups N_VL #(h2) (#: 3 to 6) obtained from the pixels 201 in the third and fourth rows are then written to the S and N data storage units 1001 and 1002. The data groups S_VL #(h3) (#: 3 to 6) and the data groups N_VL #(h3) (#: 3 to 6) obtained from the pixels 201 in the fifth and sixth rows are then written to the S and N data storage units 1001 and 1002. Such write operations are repeated in units of three HD periods.

Specifically, in the next HD period (times T2 to T3), the imaging apparatus 100 reads the N signals from the vertical signal lines cM_VL # (M: 1 to m) (#: 3 to 4), converts the N signals into digital data, and writes the converted digital data to the N data storage unit 1002. In the next HD period (times T3 to T4), the imaging apparatus 100 reads the N signals from the vertical signal lines cM_VL # (M: 1 to m) (#: 5 to 6), converts the N signals into digital data, and writes the converted digital data to the N data storage unit 1002. The imaging apparatus 100 performs similar read and write operations on the S signals as well.

From time T2 to time T3, each selection unit 901 outputs the signal of the vertical signal line cM_VL3 as the signals cM_VL3_sel and cM_VL5_sel from two outputs. Each selection unit 901 also outputs the signal of the vertical signal line cM_VL4 as the signals cM_VL4_sel and cM_VL6_sel from two outputs. From time T3 to T3w4, the selection units 901 connect the vertical signal lines cM_VL5 to the outputs cM_VL3_sel and cM_VL5_sel of the selection units 901. Meanwhile, the selection units 901 connect the vertical signal lines cM_VL6 to the outputs cM_VL4_sel and cM_VL6_sel of the selection units 901.

By such operations, AD conversions are simultaneously performed on the signals from the pixels 201 in units of two rows. Furthermore, a plurality of AD conversions is performed on a signal (N or S signal) output from each pixel 201.

Next, a description will be given of an operation for reading the signals of the pixels 201 in the first and second rows from the S and N data storage units 1001 and 1002 of the data processing unit 107. Digital data written in an HD period (for example, T1 to T2) is read in the next HD period (for example, times T2 to T3).

At time T2, the CPU 101 outputs the horizontal synchronization signal HD to the control unit 102. From time T2r1 to time T2r2, the data groups N_VL3(h1) and N_VL5(h1) in the first row and the data groups N_VL4(h1) and N_VL6(h1) in the second row are read from the N data storage unit 1002. The data groups S_VL3(h1) and S_VL5(h1) in the first row and the data groups S_VL4(h1) and S_VL6(h1) in the second row are synchronously read from the S data storage unit 1001 as well. From time T2r1 to time T2r2, the data calculation unit 1003 performs data processing on the data groups S_VL3(h1), S_VL5(h1), N_VL3(h1), and N_VL5(h1) pixel by pixel. In addition, the data calculation unit 1004 performs data processing on the data groups S_VL4(h1), S_VL6(h1), N_VL4(h1), and N_VL6(h1) pixel by pixel. The signal output unit 108 according to the present exemplary embodiment includes two data calculation units 1003 and 1004. The signal output unit 108 can thus process data on two pixels 201 in parallel. The results of the data processing (signal processing) by the data calculation units 1003 and 1004 are output from the signal output unit 108.

In such a manner, the data in the first and second rows is output from the imaging apparatus 100 in units of two pixels in one column and two rows. The data on all the pixels 201 can be output by repeating similar operations on the data in the third and fourth rows, the data in the fifth and sixth rows, and so on.

Next, a description will be given of an operation of the data calculation units 1003 and 1004. The data calculation units 1003 and 1004 perform the signal processing on the data read from the data storage units (S and N data storage units 1001 and 1002). Take the pixels 201 in the first column, for example. The data calculation unit 1003 performs the signal processing on the data N3_1_t1, N5_1_t1, S3_1_t1, and S5_1_t1. The data calculation unit 1004 performs the signal processing on the data N4_1_t, N6_1_t1, S41_t1, and S6_1_t1.

In the second mode, the signal mult_smpl_en of the circuit illustrated in FIG. 13B is high. In other words, the signal mult_smpl_en indicates the state where the multi-sampling is performed.

The data calculation unit 1003 determines whether the obtained digital data includes an abnormal value, and changes the signal processing depending on the determination result. Specifically, the data calculation unit 1003 compares the data S5_M_t1 with the threshold thresh_S representing a saturation level, and excludes a saturated signal from the targets of the multi-sampling processing.

Now, a description will be separately given of two cases with S signals of different signal values. Suppose, for example, that the S signals of the pixels 201 in an Mth column have a relative low level (low luminance), and the S signals of the pixels 201 in an Lth column different from the Mth column have a relatively high level (high luminance). For the sake of simplicity, in the following description, the data calculation unit 1003 processes data N3_M_t1, N5_M_t1, S3_M_t1, and S5_M_t1 obtained by the AD conversion of the column AD converters 204 in the Mth column. Suppose also that the data calculation unit 1003 calculates data N3_L_t1, N5_L_t1, S3_L_t1, and S5_L_t1 (L: 1 to m, L #M) obtained by the AD conversion of the column AD converters 204 in the Lth column. Which of the data calculation units 1003 and 1004 to perform signal processing depends on whether the data is based on a pixel 201 in an odd-numbered row or a pixel 201 in an even-numbered row. The operation of the data calculation unit 1004 in performing the signal processing is similar to that of the data calculation unit 1003.

As a result of the signal processing on the Mth column, the data calculation unit 1003 outputs a signal on which the multi-sampling processing is performed. As described above, the S data in the Mth column has a relatively small data value. In addition, N data typically corresponds to a dark level and thus has a small value. The S data and N data in the Mth column are therefore smaller than the corresponding thresholds thresh_S and thresh_N. In other words, both the relationships of N5_M_t1<thresh_N and S5_M_t1<thresh_S hold. The output of the OR circuit 1207 is therefore low, and the selector 1208 selects the signal from the average processing circuit 1206 and outputs the selected signal. Since the signal mult_smpl_en is high, the selector 1209 selects the signal from the selector 1208 and outputs the selected signal. As a result, based on Eq. 6, the output of the data calculation unit 1003 is expressed by the following Eq. 9.

$$SNout=\{(S3\_M\_t1+S5\_M\_t1)-(N3\_M\_t1+N5\_M\_t1)\}/2 \quad \text{(Eq. 9)}$$

In other words, the data calculation unit 1003 determines that the signal values of the pixel 201 in the M column contain no anomaly, and outputs the signal obtained by the multi-sampling. As described above, the relationship of N3_M_t1<N5_M_t1 and the relationship of S3_M_t1<S5_M_t1 are satisfied because of the differences in the offset amounts of the offset addition units 203. For the purpose of detection of circuit saturation, the determination may therefore be performed on at least the data S5_M_t1.

As a result of the signal processing on the Lth column, the data calculation unit 1003 outputs a signal on which the multi-sampling processing is not performed. As described above, the S data in the Lth column has a relatively large data value. The signal values of some of the signals thus reach a circuit saturation level due to the addition of the offsets by the offset addition units 203. Specifically, since the relationship S3_L_t1<S5_L_t1 holds, the signal value of the data S5_L_t1 reaches the circuit saturation level, and that of the data S3_L_t1 does not. As a result, the relationship S5_L_t1>thresh_S holds.

The output of the OR circuit 1207 is therefore high, and the selector 1208 selects the signal from the subtractor 1201 and outputs the selected signal. Since the signal mult_smpl_en is high, the selector 1209 selects the signal from the selector 1208 and outputs the selected signal. As a result, based on Eq. 5, the output of the data calculation unit 1003 is expressed by the following Eq. 10.

$$SNout=S3\_L\_t2-N3\_L\_t2 \quad \text{(Eq. 10)}$$

As described above, according to the present exemplary embodiment, the imaging apparatus 100 can output pixel signals of which noise is reduced by the multi-sampling processing. In a case where data to be used for the multi-sampling processing includes an abnormal value, the imaging apparatus 100 outputs data without multi-sampling. This can prevent a drop in image quality due to the multi-sampling processing. As a result, the image quality of the imaging apparatus 100 can be improved.

In the example illustrated in FIG. 13B of the present exemplary embodiment, the detection unit 611 performs a determination with only some of the digital signals (N #_M_t1 and S #_M_t1) as the targets. The detection unit 611 does not perform a determination on the other digital signals. Such a configuration can provide the effect of reducing circuit scale or reducing power consumption. Moreover, selecting the determination targets based on the operations of the offset addition units 203 can provide an additional effect. Specifically, in the present exemplary embodiment, the determination is performed on the signals to which offsets of relative large values are added (S2_M_t1>S1_M_t1). The reason is that the purpose of the determination is to detect saturation, and the signal values of the signals to which offsets of large values are added reach a saturation level first. Such a configuration can thus improve the image quality with a small circuit scale or low power consumption. It will be understood that the digital signals to be subjected to the determination change depending on the purpose of the determination. Alternatively, the determination may be performed on all the digital signals.

The determination in this exemplary embodiment has been described to be performed by comparing the digital signals with the thresholds. However, all the types of determination processing described in the first exemplary embodiment can be applied to the imaging apparatus 100 according to the present exemplary embodiment. As for configurations for performing such determinations and effects thereof, the description of the first exemplary embodiment is incorporated.

An exemplary embodiment of a photoelectric conversion system will be described. Examples of the photoelectric conversion system include a digital still camera, a digital camcorder, a surveillance camera, a camera head, a copying machine, a facsimile, a mobile phone, an in-vehicle camera, and an observation satellite.

The photoelectric conversion system includes an imaging apparatus 100 described in each of the foregoing exemplary embodiments and a signal processing unit. The signal processing unit performs processing, such as correction and data compression, on pixel signals output from the imaging apparatus 100 to obtain an image signal.

The photoelectric conversion system also includes an optical unit or circuit, such as an interchangeable lens as appropriate. The photoelectric conversion system can further include a timing generation unit that outputs various timing signals, an overall control unit that controls the entire system, and a frame memory unit for temporarily storing image data. The photoelectric conversion system also includes an interface unit for recording or reading a recording medium, and a removable recording medium such as a semiconductor memory for recording or reading captured data.

A description will be given of an exemplary embodiment of a moving body. The moving body according to the present exemplary embodiment is a vehicle including an in-vehicle camera. FIG. 16A schematically illustrates an appearance and a main internal structure of a vehicle 2100. The vehicle 2100 includes imaging apparatuses 2102, an imaging system integrated circuit (application specific integrated circuit (ASIC)) 2103, an alarm device 2112, and a main control unit 2113.

Any one of the photoelectric conversion apparatuses described in the foregoing exemplary embodiments is used as the imaging apparatuses 2102. The alarm device 2112 issues an alarm to the driver upon receiving a signal indicating an anomaly from an imaging system, a vehicle sensor, or a control unit. The main control unit 2113 controls operation of the imaging systems 2102, vehicle sensors, and control units in a centralized manner. The vehicle 2100 may be without the main control unit 2113. In such a case, the imaging systems 2102, the vehicle sensors, and the control units individually include communication interfaces and transmit and receive control signals via a communication network (for example, Controller Area Network (CAN) standard).

Figure 16B:
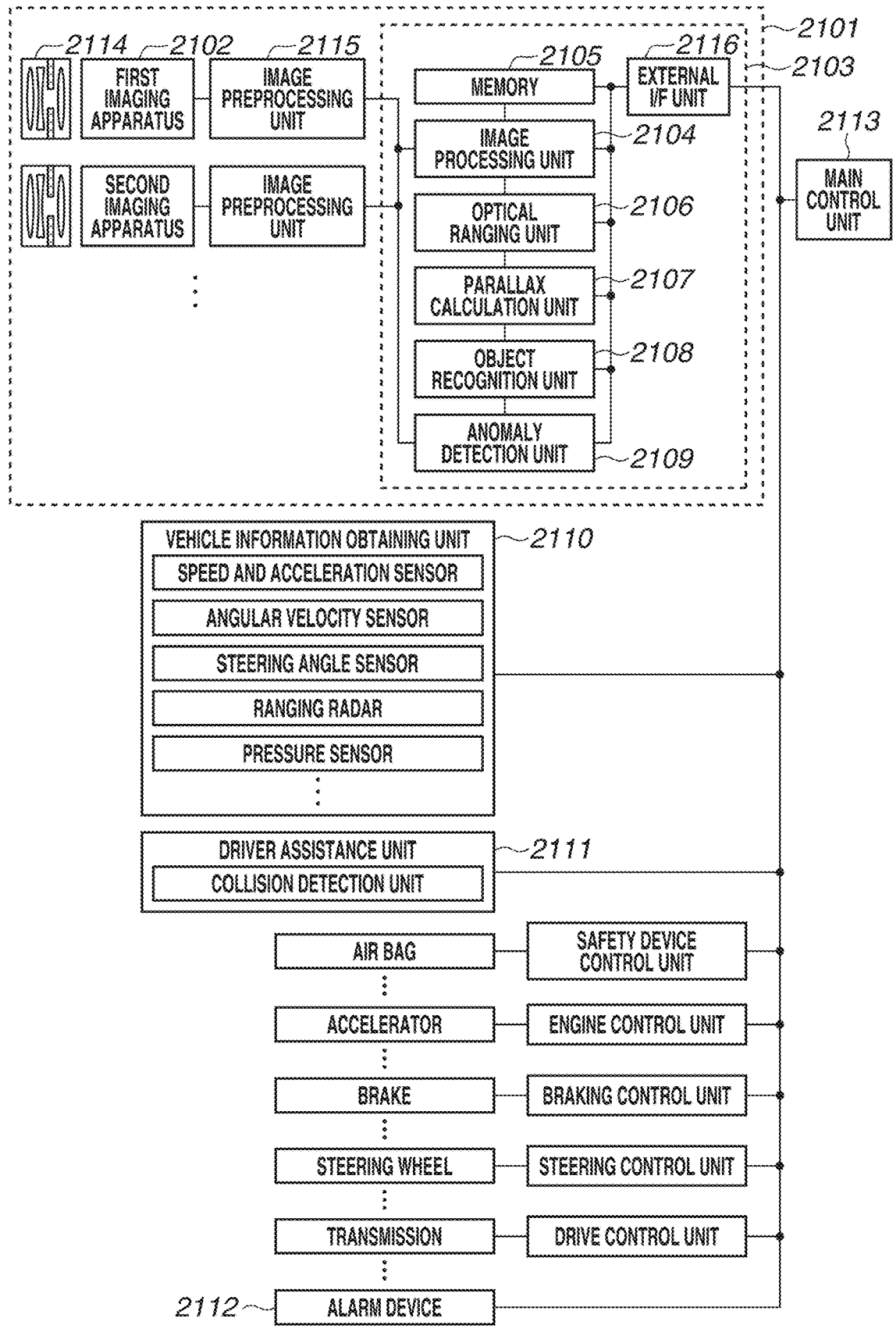
FIG. 16B is a block diagram schematically illustrating a configuration of the moving body.

FIG. 16B is a block diagram illustrating a system configuration of the vehicle 2100. The vehicle 2100 includes a first imaging apparatus 2102 and a second imaging apparatus 2102. In other words, the in-vehicle camera according to the present exemplary embodiment is a stereo camera. Optical units 2114 form object images on the imaging apparatuses 2102. Pixel signals output from the imaging apparatuses 2102 are processed by image preprocessing units 2115 and transmitted to the imaging system integrated circuit 2103. The image preprocessing units 2115 perform processing, such as an S-N calculation and the addition of a synchronization signal.

The imaging system integrated circuit 2103 includes an image processing unit or circuit 2104, a memory 2105, an optical ranging unit 2106, a parallax calculation unit or circuit 2107, an object recognition unit or circuit 2108, an anomaly detection unit or circuit 2109, and an external interface (I/F) unit or circuit 2116. The image processing unit 2104 processes the pixel signals to generate image signals. The image processing unit 2104 also corrects the image signals and interpolates abnormal pixels. The memory 2105 temporarily stores the image signals. The memory 2105 may also store the positions of known abnormal pixels in the imaging apparatuses 2102. The optical ranging unit 2106 performs focusing or ranging on an object by using the image signals. The parallax calculation unit 2107 performs object collation (stereo matching) on parallax images. The object recognition unit 2108 analyzes the image signals to recognize objects, such as a vehicle, a person, a traffic sign, and a road. The anomaly detection unit 2109 detects a failure or malfunction of the imaging apparatuses 2102. In a case where a failure or malfunction is detected, the anomaly detection unit 2109 transmits a signal indicating the detection of the anomaly to the main control unit 2113. The external I/F unit 2116 mediates information exchange between various units of the imaging system integrated circuit 2103 and the main control unit 2113 or various control units.

The vehicle 2100 includes a vehicle information obtaining unit or circuit 2110 and a driver assistance unit or circuit 2111. The vehicle information obtaining unit 2110 includes vehicle sensors such as a speed and acceleration sensor, an angular velocity sensor, a steering angle sensor, a ranging radar, and a pressure sensor.

The driver assistance unit 2111 includes a collision detection unit. The collision detection unit determines whether there is a possibility of collision with an object based on information from the optical ranging unit 2106, the parallax calculation unit 2107, and the object recognition unit 2108. The optical ranging unit 2106 and the parallax calculation unit 2107 are examples of a distance information obtaining unit that obtains distance information on an object. Specifically, the distance information refers to information about a parallax, defocus amount, and/or a distance to an object. The collision detection unit may determine the possibility of collision by using any one of such pieces of distance information. A distance information obtaining unit may be implemented by dedicatedly designed hardware or by a software module.

While an example where the driver assistance unit 2111 controls the vehicle 2100 to not collide with other objects has been described, the driver assistance unit 2111 is also applicable to automatic driving control for the vehicle 2100 to follow another vehicle or automatic driving control for the vehicle 2100 to avoid going off the lane.

The vehicle 2100 further includes driving units used for traveling, such as an air bag, an accelerator, a brake, a steering wheel, and a transmission. The vehicle 2100 further includes control units for such driving units. The control units control the corresponding driving units based on control signals from the main control unit 2113.

As described above, in the exemplary embodiment of the vehicle, the signal processing apparatuses or imaging apparatuses according to each of the foregoing exemplary embodiments are used as the imaging apparatuses 2102. Such a configuration can improve the performance of signal processing.

According to an exemplary embodiment of the present disclosure, the performance of a signal processing apparatus can be improved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-233226, filed Dec. 24, 2019 which is hereby incorporated by reference herein in its entirety.

What is claimed is:

1. A signal processing apparatus comprising:
an analog-to-digital conversion unit configured to perform a plurality of analog-to-digital conversions on one analog signal to generate at least a plurality of digital signals including a first digital signal and a second digital signal, first noise digital data signal, and second noise digital signal;
a determination unit configured to perform a determination on at least one of the plurality of digital signals, the determination unit including a comparator configured to compare the digital signal subjected to the determination with a threshold; and
a data calculation unit configured to perform calculation using the first and second digital signals,
wherein the data calculation unit is configured to generate a first calculation result by performing calculation including processing for averaging the first and second digital signals or processing for adding the first and second digital signals,
wherein the data calculation unit is configured to generate a second calculation result based on a difference between the first digital signal and the first noise digital signal, and
wherein the data calculation unit is configured to switch whether to output the first calculation result or output the second calculation result, based on a comparison result of the comparator.

2. The signal processing apparatus according to claim 1, wherein the determination unit is configured to determine that a signal value of the digital signal subjected to the determination has reached a saturation level.

3. The signal processing apparatus according to claim 1, wherein the determination unit is configured to determine whether the digital signal subjected to the determination includes an error, or a probability of an error in the digital signal subjected to the determination.

4. The signal processing apparatus according to claim 1, wherein the determination unit is configured to perform the determination by using a trained model generated by machine learning or deep learning.

5. The signal processing apparatus according to claim 1, wherein the determination unit is configured to perform the determination on part of the plurality of digital signals and not perform the determination on another part of the plurality of digital signals.

6. The signal processing apparatus according to claim 1, wherein the one analog signal is input to a plurality of analog-to-digital conversion circuits included in the analog-to-digital conversion unit.

7. The signal processing apparatus according to claim 1, further comprising an offset addition unit configured to add an offset to the one analog signal,
wherein the offset addition unit is configured to output two analog signals to each of which an offset of a different value is added, and
wherein the analog-to-digital conversion unit is configured to perform the plurality of analog-to-digital conversions by performing an analog-to-digital conversion on each of the two analog signals.

8. The signal processing apparatus according to claim 1,
wherein the second digital signal has a signal value greater than a signal value of the first digital signal, and
wherein the determination unit is configured to compare the second digital signal with the threshold and not perform the determination on the first digital signal.

9. The signal processing apparatus according to claim 8, further comprising
an offset addition unit configured to add an offset to the one analog signal,
wherein the offset addition unit is configured to output a first offset signal to which an offset of first value is added and a second offset signal to which an offset of second value greater than the first value is added,
wherein the analog-to-digital conversion unit is configured to generate the first digital signal by performing an analog-to-digital conversion on the first offset signal, and
wherein the analog-to-digital conversion unit is configured to generate the second digital signal by performing an analog-to-digital conversion on the second offset signal.

10. The signal processing apparatus according to claim 1, wherein the data calculation unit is configured to switch whether to output a result of average processing performed on the plurality of digital signals or output a result of calculation using only part of the plurality of digital signals, based on a result of the determination performed by the determination unit.

11. A photoelectric conversion apparatus comprising:
a photoelectric conversion element; and
the signal processing apparatus according to claim 1,
wherein an analog signal based on a charge occurring in the photoelectric conversion element is input to the analog-to-digital conversion unit.

12. A moving body comprising:
the photoelectric conversion system according to claim 11; and
a control unit configured to control the moving body based on an image signal obtained by the photoelectric conversion system.

13. An imaging apparatus comprising:
a pixel unit including a plurality of pixels arranged in a matrix including a plurality of rows and a plurality of columns;
an analog-to-digital conversion unit configured to perform a plurality of analog-to-digital conversions on a signal to generate at least first digital signal and second digital signal, the signal being based on incident light and generated by a first pixel of the pixel unit, and perform a plurality of analog-to-digital conversions on a noise signal to generate at least first noise digital signal and second noise digital signal, the noise signal being generated by the first pixel;

a comparator configured to compare at least the second digital signal with a threshold; and a data calculation unit configured to perform calculation using the first digital signal and the second digital signal, wherein the data calculation unit is configured to generate a first calculation result by performing calculation including processing for averaging the first digital data and the second digital signal or processing for adding the first digital data and the second digital signal, wherein the data calculation unit is configured to generate a second calculation result based on a difference between the first digital signal and the first noise digital signal, and wherein the data calculation unit is configured to switch whether to output first calculation result or output the second calculation result, based on a comparison result of the comparator.

14. The imaging apparatus according to claim 13, wherein the data calculation unit is configured to perform the calculation including the processing for averaging the first digital signal and the second digital signal or the processing for adding the first digital signal and the second digital signal.

15. The imaging apparatus according to claim 13, further comprising an offset addition unit configured to add an offset of first value to the first digital signal and add an offset of second value greater than the first value to the second digital signal.

16. The imaging apparatus according to claim 15, further comprising:

a plurality of signal lines including a first signal line and a second signal line; and a selection unit configured to select one or a plurality of signals from among signals of the plurality of signal lines, and output the selected signal(s) to the analog-to-digital conversion unit, wherein one of the plurality of columns includes the first pixel and a second pixel different from the first pixel, wherein the analog-to-digital conversion unit includes a first analog-to-digital conversion circuit and a second analog-to-digital conversion circuit, wherein the selection unit is configured to, in a first mode, output a signal output from the first pixel to the first signal line to the first analog-to-digital conversion circuit and output a signal output from the second pixel to the second signal line to the second analog-to-digital conversion circuit in parallel, and wherein the selection unit is configured to, in a second mode, output the signal output from the first pixel to both the first and second analog-to-digital conversion circuits.

17. The imaging apparatus according to claim 16, wherein the plurality of signal lines further includes a third signal line and a fourth signal line, wherein the one of the plurality of columns further includes a third pixel and a fourth pixel, wherein the analog-to-digital conversion unit further includes a third analog-to-digital conversion circuit and a fourth analog-to-digital conversion circuit, wherein the selection unit is configured to, in the first mode, individually output the signal output from the first pixel to the first signal line, the signal output from the second pixel to the second signal line, a signal output from the third pixel to the third signal line, and a signal output from the fourth pixel to the fourth signal line to the first to fourth analog-to-digital conversion circuits, respectively, and wherein the selection unit is configured to, in the second mode, output the signal of the first pixel to both the first and second analog-to-digital conversion circuits and the signal of the second pixel to both the third and fourth analog-to-digital conversion circuits in parallel in a first period, and output the signal of the third pixel to both the first and second analog-to-digital conversion circuits and output the signal of the fourth pixel to both the third and fourth analog-to-digital conversion circuits in parallel in a second period subsequent to the first period.

* * * * *